United States Patent
Koziol et al.

(10) Patent No.: US 12,108,424 B2
(45) Date of Patent: Oct. 1, 2024

(54) MULTI-CONFIGURED GRANT SUPPORT FOR MULTIPLE TIME-SENSITIVE-NETWORK DATA FLOWS

(71) Applicant: Nokia Technologies Oy, Espoo (FI)

(72) Inventors: Dawid Koziol, Glogow (PL); Troels Emil Kolding, Klarup (DK); Daniela Laselva, Klarup (DK); Klaus Hugl, Vienna (AT); Guillermo Pocovi, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 388 days.

(21) Appl. No.: 17/602,098

(22) PCT Filed: Apr. 8, 2019

(86) PCT No.: PCT/EP2019/058850
§ 371 (c)(1),
(2) Date: Oct. 7, 2021

(87) PCT Pub. No.: WO2020/207558
PCT Pub. Date: Oct. 15, 2020

(65) Prior Publication Data
US 2022/0217726 A1      Jul. 7, 2022

(51) Int. Cl.
*H04W 72/53*      (2023.01)
(52) U.S. Cl.
CPC .................... *H04W 72/53* (2023.01)
(58) Field of Classification Search
CPC ............... H04W 72/53; H04W 72/0446
See application file for complete search history.

(56) References Cited

U.S. PATENT DOCUMENTS

| | | | |
|---|---|---|---|
| 2018/0070368 A1* | 3/2018 | Quan | H04L 1/1887 |
| 2018/0176937 A1* | 6/2018 | Chen | H04W 72/21 |
| 2018/0288746 A1* | 10/2018 | Zhang | H04L 1/0031 |
| 2018/0368174 A1* | 12/2018 | Jeon | H04W 72/044 |

(Continued)

FOREIGN PATENT DOCUMENTS

| | | |
|---|---|---|
| EP | 3 282 620 A1 | 2/2018 |
| EP | 3 361 810 A1 | 8/2018 |
| WO | WO 2018/210493 A1 | 11/2018 |

OTHER PUBLICATIONS

3GPP TSG-RAN WG2 Meeting #99, Berlin, Germany, Aug. 21-25, 2017, R2-1708592, "Multiple UL SPS configuration collision handling", Nokia, Nokia Shanghai Bell, 4 pgs.

(Continued)

*Primary Examiner* — Benjamin H Elliott, IV
(74) *Attorney, Agent, or Firm* — Lippes Mathias LLP

(57) ABSTRACT

An apparatus including circuitry configured for: transmitting a first data flow in resources of a first periodic resource configuration; and transmitting a second data flow in resources of a second periodic resource configuration, determining that there is an at least partial overlap in time between a first allocation of the first periodic resource configuration and a second allocation of the second periodic resource configuration; and in response to determining that there is the at least partial overlap, transmitting data of the first data flow and data of the second data flow in resources of at least one further periodic resource configuration.

30 Claims, 12 Drawing Sheets

(56) References Cited

U.S. PATENT DOCUMENTS

| | | | | |
|---|---|---|---|---|
| 2018/0376487 A1* | 12/2018 | Feng | .................... | H04W 72/12 |
| 2019/0207663 A1* | 7/2019 | Shimezawa | .......... | H04B 17/309 |
| 2019/0230689 A1* | 7/2019 | Cao | .................... | H04L 27/2602 |
| 2020/0163083 A1* | 5/2020 | Yu | ....................... | H04W 72/044 |
| 2020/0350969 A1* | 11/2020 | Shimezawa | .......... | H04B 7/0626 |
| 2020/0351020 A1* | 11/2020 | Jeon | ..................... | H04W 72/23 |
| 2021/0068086 A1* | 3/2021 | Behravan | .............. | H04L 5/0053 |
| 2022/0217726 A1* | 7/2022 | Koziol | ................. | H04W 72/53 |

OTHER PUBLICATIONS

U.S. Appl. No. 62/805,403, "Semi-Persistent Transmission Timing Adaptation Based on Application Clock Shifts", filed Feb. 14, 2019, pp. 1-47.

"3rd Generation Partnership Project; Technical Specification Group Radio Access Network; NR; User Equipment (UE) radio transmission and reception; Part 1: Range 1 Standalone (Release 15)", 3GPP TS 38.101-1, V15.4.0, Dec. 2018, pp. 1-230.

"New WID: Support of NR Industrial Internet of Things (IOT)", 3GPP TSG RAN Meeting #83, RP-190728, Agenda: 9.1.2, Nokia, Mar. 18-21, 2019, 6 pages.

"New WID: Physical Layer Enhancements for NR Ultra-Reliable and Low Latency Communication (URLLC)", 3GPP TSG RAN Meeting #83, RP-190726, Agenda: 9.1.1, Huawei, Mar. 18-21, 2019, 5 pages.

International Search Report and Written Opinion received for corresponding Patent Cooperation Treaty Application No. PCT/EP2019/058850, dated Dec. 13, 2019, 12 pages.

Office action received for corresponding European Patent Application No. 19717462.6, dated Feb. 8, 2024, 8 pages.

* cited by examiner

MULTI-CONFIGURED GRANT SUPPORT FOR MULTIPLE TIME-SENSITIVE-NETWORK DATA FLOWS

CROSS REFERENCE TO RELATED APPLICATION

This patent application is a U.S. National Stage application of International Patent Application Number PCT/EP2019/058850 filed Apr. 8, 2019, which is hereby incorporated by reference in its entirety.

FIELD OF THE INVENTION

This disclosure relates to a method and apparatus, and in particular, but not exclusively, to a method and apparatus for handling colliding resource configurations used for the transmission of data flows.

BACKGROUND

A communication system can be seen as a facility that enables communication between two or more devices such as user terminals, machine-like terminals, base stations and/or other nodes by providing carriers between the communication devices. A communication system can be provided, for example, by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

SUMMARY

According to a first aspect, there is provided an apparatus comprising means for transmitting a first data flow in resources of a first resource configuration; and transmitting a second data flow in resources of a second resource configuration; determining that there is an at least partial overlap in time between a first allocation of the first resource configuration and a second allocation of the second resource configuration; and in response to determining that there is the at least partial overlap, transmitting data of the first data flow and data of the second data flow in resources of at least one further resource configuration.

In some examples, the apparatus comprises means for transmitting the data of the first data flow in an allocation of a first of the at least one further resource configuration; and transmitting the data of the second data flow in the allocation of the first at least one further resource configuration.

In some examples, the frequency width of the allocation of the first at least one further resource configuration is greater than the frequency width of the first allocation and the frequency width second allocation.

In some examples, the transmitting the data of the first data flow in the allocation of the first of the at least one further resource configuration comprises transmitting the data of the first data flow in a first transport block, wherein the transmitting the data of the second data flow in the allocation of the first at least one further resource configuration comprises transmitting the data of the second data flow in the first transport block.

In some examples, the transmitting data of the first data flow and data of the second data flow in resources of at least one further resource configuration comprises transmitting data of the first data flow and data of the second data flow in a combination of resources of the first resource configuration and the second resource configuration.

In some examples, the apparatus comprises means for: determining that there is substantially a complete overlap in time between the first allocation and the second allocation; and in response to determining that there is substantially the complete overlap, performing the transmitting data of the first data flow and data of the second data flow in the combination of resources of the first resource configuration and the second resource configuration.

In some examples, the apparatus comprises means for: determining that there is a partial overlap in time between the first allocation and the second allocation; and in response to determining that there is the partial overlap, performing the transmission of the data of the first data flow and the data of the second data flow in the allocation beginning from a start in time of the second allocation, wherein the first allocation begins prior to the second allocation.

In some examples, the apparatus comprising means for transmitting: the data of the first data flow in resources of a first of the at least one further period resource configuration; and the data of the second data flow in resources of a second of the at least one further resource configuration, wherein the second of the at least one further resource configuration comprises an allocation following an allocation of the first of the at least one further resource configuration.

In some examples, the apparatus comprises means for determining that there is a partial overlap in time between the first allocation and the second allocation; and in response to determining that there is the partial overlap, performing the transmitting: the data of the first data flow in resources of the first of the at least one further period resource configuration; and the data of the second data flow in resources of the second of the at least one further resource configuration.

In some examples, the first of the at least one further resource configuration is configured with different parameters to the second of the at least one further resource configuration, wherein the parameters comprise at least one of: modulation and coding scheme; target code rate; target transport block size; frequency domain resources allocation; time domain resources allocation; block error rate target per transmission; reliability target per transmission; and quality of service requirements.

In some examples, the apparatus comprises means for determining a modulation and coding scheme to use for transmitting data on the at least one further resource configuration in dependence upon at least one of: a modulation and coding scheme used for transmitting the first data flow in the resources of the first resource configuration; and a modulation and coding scheme used for transmitting the second data flow in the resources of the second resource configuration.

In some examples, the apparatus comprises means for determining the at least one further resource configuration in dependence upon the first resource configuration and the second resource configuration.

In some examples, the first resource configuration comprises a first periodic resource pattern; the second resource configuration comprises a second periodic resource pattern; and the at least one further resource configuration comprises at least one further periodic resource pattern.

In some examples, the first periodic resource pattern comprises a first configured grant, wherein the second periodic resource pattern comprises a second configured grant, wherein the at least one further periodic resource pattern comprises at least one further configured grant.

In some examples, the first periodic resource pattern, the second periodic resource pattern, and the at least one further periodic resource pattern each comprise resources on which data is semi-persistently scheduled for transmission.

According to second aspect, there is provided a network side apparatus comprising the apparatus of the first aspect.

According to a third aspect, there is provided a user equipment comprising the apparatus of the first aspect.

In some examples, the apparatus comprises means for receiving control information from a network side apparatus; and in response to the received control information, performing the determining that there is an at least partial overlap in time between a first allocation of the first resource configuration and a second allocation of the second resource configuration.

According to a fourth aspect, there is provided an apparatus comprising means for receiving a first data flow in resources of a first resource configuration; receiving a second data flow in resources of a second resource configuration; determining that there is an at least partial overlap in time between a first allocation of the first resource configuration and a second allocation of the second resource configuration; receiving data of the first data flow and data of the second data flow in resources of at least one further resource configuration; and in response to determining that there is the at least partial overlap, decoding the data of the first data flow and the data of the second data flow received in the resources of at least one further resource configuration.

In some examples, the apparatus comprises means for: receiving the data of the first data flow in an allocation of a first of the at least one further resource configuration; and receiving the data of the second data flow in the allocation of the first at least one further resource configuration.

In some examples, the frequency width of the allocation of the first at least one further resource configuration is greater than the frequency width of the first allocation and the frequency width of the second allocation.

In some examples, the receiving the data of the first data flow in the allocation of the first of the at least one further resource configuration comprises receiving the data of the first data flow in a first transport block, wherein the receiving the data of the second data flow in the allocation of the first at least one further resource configuration comprises receiving the data of the second data flow in the first transport block, the apparatus comprising means for, in response to determining that there is the at least partial overlap, decoding the first transport block.

In some examples, the receiving data of the first data flow and data of the second data flow in resources of at least one further resource configuration comprises receiving data of the first data flow and data of the second data flow in a combination of resources of the first resource configuration and the second resource configuration.

In some examples, the apparatus comprises means for: determining that there is substantially a complete overlap in time between the first allocation and the second allocation; and in response to determining that there is substantially the complete overlap, decoding the data of the first data flow and data of the second data flow received in the combination of resources of the first allocation and the second allocation.

In some examples, the apparatus comprises means for: receiving the data of the first data flow and the data of the second data flow in the allocation beginning from a start in time of the second allocation; determining that there is a partial overlap in time between the first allocation and the second allocation; and in response to determining that there is the partial overlap, decoding the data of the first data flow and the data of the second data flow received in the allocation beginning from the start in time of the second allocation, wherein the first allocation begins prior to the second allocation.

In some examples, the apparatus comprises means for receiving and decoding: the data of the first data flow in resources of a first of the at least one further period resource configuration; and the data of the second data flow in resources of a second of the at least one further resource configuration, wherein the second of the at least one further resource configuration comprises an allocation following an allocation of the first of the at least one further resource configuration.

In some examples, the apparatus comprises means for: determining that there is a partial overlap in time between the first allocation and the second allocation; and in response to determining that there is the partial overlap, performing the decoding of: the data of the first data flow in resources of the first of the at least one further period resource configuration; and the data of the second data flow in resources of the second of the at least one further resource configuration.

In some examples, the first of the at least one further resource configuration is configured with different parameters to the second of the at least one further resource configuration, wherein the different parameters comprise at least one of: modulation and coding scheme; target code rate; target transport block size; frequency domain resources allocation; time domain resources allocation; block error rate target per transmission; reliability target per transmission; and quality of service requirements.

In some examples, the apparatus comprises means for: determining a modulation and coding scheme for use on the at least one further resource configuration in dependence upon at least one of: a modulation and coding scheme used for the first data flow in the resources of the first resource configuration; and a modulation and coding scheme used for the second data flow in the resources of the second resource configuration; and performing the decoding of the data of the first data flow and the data of the second data flow according to the determined modulation and coding scheme.

In some examples, the apparatus comprises means for determining the at least one further resource configuration in dependence upon the first resource configuration and the second resource configuration; and performing the decoding of the data of the first data flow and the data of the second data flow in dependence upon the determined at least one further resource configuration.

In some examples: the first resource configuration comprises a first periodic resource pattern; the second resource configuration comprises a second periodic resource pattern; and the at least one further resource configuration comprises at least one further periodic resource pattern.

In some examples, the first periodic resource pattern comprises a first configured grant, wherein the second periodic resource pattern comprises a second configured grant, wherein the at least one further periodic resource pattern comprises at least one further configured grant.

In some examples, the first periodic resource pattern, the second periodic resource pattern, and the at least one further periodic resource pattern comprises resources on which data is semi-persistently scheduled for transmission.

According to a fifth aspect, there is provided a network side apparatus comprising the apparatus of the fourth aspect.

According to a sixth aspect, there is provided a user equipment comprising the apparatus of the fourth aspect.

In some examples, the apparatus comprises means for: receiving control information from a network side apparatus; and in response to the received control information, performing the determining that there is an at least partial overlap in time between a first allocation of the first resource configuration and a second allocation of the second resource configuration. According to a seventh aspect, there is provided a method comprising: transmitting a first data flow in resources of a first resource configuration; and transmitting a second data flow in resources of a second resource configuration; determining that there is an at least partial overlap in time between a first allocation of the first resource configuration and a second allocation of the second resource configuration; and in response to determining that there is the at least partial overlap, transmitting data of the first data flow and data of the second data flow in resources of at least one further resource configuration.

In some examples, the method comprises transmitting the data of the first data flow in an allocation of a first of the at least one further resource configuration; and transmitting the data of the second data flow in the allocation of the first at least one further resource configuration.

In some examples, the frequency width of the allocation of the first at least one further resource configuration is greater than the frequency width of the first allocation and the frequency width second allocation.

In some examples, the transmitting the data of the first data flow in the allocation of the first of the at least one further resource configuration comprises transmitting the data of the first data flow in a first transport block, wherein the transmitting the data of the second data flow in the allocation of the first at least one further resource configuration comprises transmitting the data of the second data flow in the first transport block.

In some examples, the transmitting data of the first data flow and data of the second data flow in resources of at least one further resource configuration comprises transmitting data of the first data flow and data of the second data flow in a combination of resources of the first resource configuration and the second resource configuration.

In some examples, the method comprises: determining that there is substantially a complete overlap in time between the first allocation and the second allocation; and in response to determining that there is substantially the complete overlap, performing the transmitting data of the first data flow and data of the second data flow in the combination of resources of the first resource configuration and the second resource configuration.

In some examples, the method comprises: determining that there is a partial overlap in time between the first allocation and the second allocation; and in response to determining that there is the partial overlap, performing the transmission of the data of the first data flow and the data of the second data flow in the allocation beginning from a start in time of the second allocation, wherein the first allocation begins prior to the second allocation.

In some examples, the method comprises transmitting: the data of the first data flow in resources of a first of the at least one further period resource configuration; and the data of the second data flow in resources of a second of the at least one further resource configuration, wherein the second of the at least one further resource configuration comprises an allocation following an allocation of the first of the at least one further resource configuration.

In some examples, the method comprises: determining that there is a partial overlap in time between the first allocation and the second allocation; and in response to determining that there is the partial overlap, performing the transmitting: the data of the first data flow in resources of the first of the at least one further period resource configuration; and the data of the second data flow in resources of the second of the at least one further resource configuration.

In some examples, the first of the at least one further resource configuration is configured with different parameters to the second of the at least one further resource configuration, wherein the parameters comprise at least one of: modulation and coding scheme; target code rate; target transport block size; frequency domain resources allocation; time domain resources allocation; block error rate target per transmission; reliability target per transmission; and quality of service requirements.

In some examples, the method comprises: determining a modulation and coding scheme to use for transmitting data on the at least one further resource configuration in dependence upon at least one of: a modulation and coding scheme used for transmitting the first data flow in the resources of the first resource configuration; and a modulation and coding scheme used for transmitting the second data flow in the resources of the second resource configuration.

In some examples, the method comprises: determining the at least one further resource configuration in dependence upon the first resource configuration and the second resource configuration.

In some examples, the first resource configuration comprises a first periodic resource pattern; the second resource configuration comprises a second periodic resource pattern; and the at least one further resource configuration comprises at least one further periodic resource pattern.

In some examples, the first periodic resource pattern comprises a first configured grant, wherein the second periodic resource pattern comprises a second configured grant, wherein the at least one further periodic resource pattern comprises at least one further configured grant.

In some examples, the first periodic resource pattern, the second periodic resource pattern, and the at least one further periodic resource pattern each comprise resources on which data is semi-persistently scheduled for transmission.

According to eighth aspect, there is provided a network side apparatus configured to perform the method of the seventh aspect.

According to a ninth aspect, there is provided a user equipment configured to perform the method of the seventh aspect.

In some examples, the method comprises: receiving control information from a network side apparatus; and in response to the received control information, performing the determining that there is an at least partial overlap in time between a first allocation of the first resource configuration and a second allocation of the second resource configuration.

According to a tenth aspect, there is provided a method comprising: receiving a first data flow in resources of a first resource configuration; receiving a second data flow in resources of a second resource configuration; determining that there is an at least partial overlap in time between a first allocation of the first resource configuration and a second allocation of the second resource configuration; receiving data of the first data flow and data of the second data flow in resources of at least one further resource configuration;

and in response to determining that there is the at least partial overlap, decoding the data of the first data flow and the data of the second data flow received in the resources of at least one further resource configuration.

In some examples, there is provided a method comprising: receiving the data of the first data flow in an allocation of a first of the at least one further resource configuration; and receiving the data of the second data flow in the allocation of the first at least one further resource configuration.

In some examples, the frequency width of the allocation of the first at least one further resource configuration is greater than the frequency width of the first allocation and the frequency width of the second allocation.

In some examples, the receiving the data of the first data flow in the allocation of the first of the at least one further resource configuration comprises receiving the data of the first data flow in a first transport block, wherein the receiving the data of the second data flow in the allocation of the first at least one further resource configuration comprises receiving the data of the second data flow in the first transport block, the method comprising in response to determining that there is the at least partial overlap, decoding the first transport block.

In some examples, the receiving data of the first data flow and data of the second data flow in resources of at least one further resource configuration comprises receiving data of the first data flow and data of the second data flow in a combination of resources of the first resource configuration and the second resource configuration.

In some examples, the method comprises: determining that there is substantially a complete overlap in time between the first allocation and the second allocation; and in response to determining that there is substantially the complete overlap, decoding the data of the first data flow and data of the second data flow received in the combination of resources of the first allocation and the second allocation.

In some examples, the method comprises: receiving the data of the first data flow and the data of the second data flow in the allocation beginning from a start in time of the second allocation; determining that there is a partial overlap in time between the first allocation and the second allocation; and in response to determining that there is the partial overlap, decoding the data of the first data flow and the data of the second data flow received in the allocation beginning from the start in time of the second allocation, wherein the first allocation begins prior to the second allocation.

In some examples, the method comprises receiving and decoding: the data of the first data flow in resources of a first of the at least one further period resource configuration; and the data of the second data flow in resources of a second of the at least one further resource configuration, wherein the second of the at least one further resource configuration comprises an allocation following an allocation of the first of the at least one further resource configuration.

In some examples, the method comprises: determining that there is a partial overlap in time between the first allocation and the second allocation; and in response to determining that there is the partial overlap, performing the decoding of: the data of the first data flow in resources of the first of the at least one further period resource configuration; and the data of the second data flow in resources of the second of the at least one further resource configuration.

In some examples, the first of the at least one further resource configuration is configured with different parameters to the second of the at least one further resource configuration, wherein the different parameters comprise at least one of: modulation and coding scheme; target code rate; target transport block size; frequency domain resources allocation; time domain resources allocation; block error rate target per transmission; reliability target per transmission; and quality of service requirements.

In some examples, the method comprises: determining a modulation and coding scheme for use on the at least one further resource configuration in dependence upon at least one of: a modulation and coding scheme used for the first data flow in the resources of the first resource configuration; and a modulation and coding scheme used for the second data flow in the resources of the second resource configuration; and performing the decoding of the data of the first data flow and the data of the second data flow according to the determined modulation and coding scheme.

In some examples, the method comprises determining the at least one further resource configuration in dependence upon the first resource configuration and the second resource configuration; and performing the decoding of the data of the first data flow and the data of the second data flow in dependence upon the determined at least one further resource configuration.

In some examples: the first resource configuration comprises a first periodic resource pattern; the second resource configuration comprises a second periodic resource pattern; and the at least one further resource configuration comprises at least one further periodic resource pattern.

In some examples, the first periodic resource pattern comprises a first configured grant, wherein the second periodic resource pattern comprises a second configured grant, wherein the at least one further periodic resource pattern comprises at least one further configured grant.

In some examples, the first periodic resource pattern, the second periodic resource pattern, and the at least one further periodic resource pattern comprises resources on which data is semi-persistently scheduled for transmission.

According to a eleventh aspect, there is provided a network side apparatus configured to perform the method of the tenth aspect.

According to a twelfth aspect, there is provided a user equipment configured to perform the method of the tenth aspect.

In some examples, the method comprises: receiving control information from a network side apparatus; and in response to the received control information, performing the determining that there is an at least partial overlap in time between a first allocation of the first resource configuration and a second allocation of the second resource configuration.

According to a thirteenth aspect, there is provided a computer program comprising instructions for causing an apparatus to perform at least: transmitting a first data flow in resources of a first resource configuration; and transmitting a second data flow in resources of a second resource configuration; determining that there is an at least partial overlap in time between a first allocation of the first resource configuration and a second allocation of the second resource configuration; and in response to determining that there is the at least partial overlap, transmitting data of the first data flow and data of the second data flow in resources of at least one further resource configuration.

In some examples, the computer program comprising instructions for causing the apparatus to perform at least: transmitting the data of the first data flow in an allocation of a first of the at least one further resource configuration; and transmitting the data of the second data flow in the allocation of the first at least one further resource configuration.

In some examples, the frequency width of the allocation of the first at least one further resource configuration is greater than the frequency width of the first allocation and the frequency width second allocation.

In some examples, the transmitting the data of the first data flow in the allocation of the first of the at least one further resource configuration comprises transmitting the data of the first data flow in a first transport block, wherein the transmitting the data of the second data flow in the allocation of the first at least one further resource configuration comprises transmitting the data of the second data flow in the first transport block.

In some examples, the transmitting data of the first data flow and data of the second data flow in resources of at least one further resource configuration comprises transmitting data of the first data flow and data of the second data flow in a combination of resources of the first resource configuration and the second resource configuration.

In some examples, the computer program comprising instructions for causing the apparatus to perform at least: determining that there is substantially a complete overlap in time between the first allocation and the second allocation; and in response to determining that there is substantially the complete overlap, performing the transmitting data of the first data flow and data of the second data flow in the combination of resources of the first resource configuration and the second resource configuration.

In some examples, the computer program comprising instructions for causing the apparatus to perform at least: determining that there is a partial overlap in time between the first allocation and the second allocation; and in response to determining that there is the partial overlap, performing the transmission of the data of the first data flow and the data of the second data flow in the allocation beginning from a start in time of the second allocation, wherein the first allocation begins prior to the second allocation.

In some examples, the computer program comprising instructions for causing the apparatus to perform at least transmitting: the data of the first data flow in resources of a first of the at least one further period resource configuration; and the data of the second data flow in resources of a second of the at least one further resource configuration, wherein the second of the at least one further resource configuration comprises an allocation following an allocation of the first of the at least one further resource configuration.

In some examples, the computer program comprising instructions for causing the apparatus to perform at least: determining that there is a partial overlap in time between the first allocation and the second allocation; and in response to determining that there is the partial overlap, performing the transmitting: the data of the first data flow in resources of the first of the at least one further period resource configuration; and the data of the second data flow in resources of the second of the at least one further resource configuration.

In some examples, the first of the at least one further resource configuration is configured with different parameters to the second of the at least one further resource configuration, wherein the parameters comprise at least one of: modulation and coding scheme; target code rate; target transport block size; frequency domain resources allocation; time domain resources allocation; block error rate target per transmission; reliability target per transmission; and quality of service requirements.

In some examples, the computer program comprising instructions for causing the apparatus to perform at least: determining a modulation and coding scheme to use for transmitting data on the at least one further resource configuration in dependence upon at least one of: a modulation and coding scheme used for transmitting the first data flow in the resources of the first resource configuration; and a modulation and coding scheme used for transmitting the second data flow in the resources of the second resource configuration.

In some examples, the computer program comprising instructions for causing the apparatus to perform at least: determining the at least one further resource configuration in dependence upon the first resource configuration and the second resource configuration.

In some examples, the first resource configuration comprises a first periodic resource pattern; the second resource configuration comprises a second periodic resource pattern; and the at least one further resource configuration comprises at least one further periodic resource pattern In some examples, the first periodic resource pattern comprises a first configured grant, wherein the second periodic resource pattern comprises a second configured grant, wherein the at least one further periodic resource pattern comprises at least one further configured grant.

In some examples, the first periodic resource pattern, the second periodic resource pattern, and the at least one further periodic resource pattern each comprise resources on which data is semi-persistently scheduled for transmission.

In some examples, the apparatus comprises a network side apparatus.

In some examples, the apparatus comprises a user equipment.

In some examples, the computer program comprising instructions for causing the apparatus to perform at least receiving control information from a network side apparatus; and in response to the received control information, performing the determining that there is an at least partial overlap in time between a first allocation of the first resource configuration and a second allocation of the second resource configuration.

According to a fourteenth aspect, there is provided a computer program comprising instructions for causing the apparatus to perform at least: receiving a first data flow in resources of a first resource configuration; receiving a second data flow in resources of a second resource configuration; determining that there is an at least partial overlap in time between a first allocation of the first resource configuration and a second allocation of the second resource configuration; receiving data of the first data flow and data of the second data flow in resources of at least one further resource configuration; and in response to determining that there is the at least partial overlap, decoding the data of the first data flow and the data of the second data flow received in the resources of at least one further resource configuration.

In some examples, there is provided a computer program comprising instructions for causing the apparatus to perform at least: receiving the data of the first data flow in an allocation of a first of the at least one further resource configuration; and receiving the data of the second data flow in the allocation of the first at least one further resource configuration.

In some examples, the frequency width of the allocation of the first at least one further resource configuration is greater than the frequency width of the first allocation and the frequency width of the second allocation.

In some examples, the receiving the data of the first data flow in the allocation of the first of the at least one further resource configuration comprises receiving the data of the first data flow in a first transport block, wherein the receiving the data of the second data flow in the allocation of the first at least one further resource configuration comprises receiving the data of the second data flow in the first transport block, the computer program comprising instructions for causing the apparatus to perform at least, in response to determining that there is the at least partial overlap, decoding the first transport block.

In some examples, the receiving data of the first data flow and data of the second data flow in resources of at least one further resource configuration comprises receiving data of the first data flow and data of the second data flow in a combination of resources of the first resource configuration and the second resource configuration.

In some examples, the computer program comprising instructions for causing the apparatus to perform at least: determining that there is substantially a complete overlap in time between the first allocation and the second allocation; and in response to determining that there is substantially the complete overlap, decoding the data of the first data flow and data of the second data flow received in the combination of resources of the first allocation and the second allocation.

In some examples, the computer program comprising instructions for causing the apparatus to perform at least: receiving the data of the first data flow and the data of the second data flow in the allocation beginning from a start in time of the second allocation; determining that there is a partial overlap in time between the first allocation and the second allocation; and in response to determining that there is the partial overlap, decoding the data of the first data flow and the data of the second data flow received in the allocation beginning from the start in time of the second allocation, wherein the first allocation begins prior to the second allocation.

In some examples, the computer program comprising instructions for causing an apparatus to perform at least receiving and decoding: the data of the first data flow in resources of a first of the at least one further period resource configuration; and the data of the second data flow in resources of a second of the at least one further resource configuration, wherein the second of the at least one further resource configuration comprises an allocation following an allocation of the first of the at least one further resource configuration.

In some examples, the computer program comprising instructions for causing an apparatus to perform at least: determining that there is a partial overlap in time between the first allocation and the second allocation; and in response to determining that there is the partial overlap, performing the decoding of: the data of the first data flow in resources of the first of the at least one further period resource configuration; and the data of the second data flow in resources of the second of the at least one further resource configuration.

In some examples, the first of the at least one further resource configuration is configured with different parameters to the second of the at least one further resource configuration, wherein the different parameters comprise at least one of: modulation and coding scheme; target code rate; target transport block size; frequency domain resources allocation; time domain resources allocation; block error rate target per transmission; reliability target per transmission; and quality of service requirements.

In some examples, the computer program comprising instructions for causing the apparatus to perform at least: determining a modulation and coding scheme for use on the at least one further resource configuration in dependence upon at least one of: a modulation and coding scheme used for the first data flow in the resources of the first resource configuration; and a modulation and coding scheme used for the second data flow in the resources of the second resource configuration; and performing the decoding of the data of the first data flow and the data of the second data flow according to the determined modulation and coding scheme.

In some examples, the computer program comprising instructions for causing the apparatus to perform at least determining the at least one further resource configuration in dependence upon the first resource configuration and the second resource configuration; and performing the decoding of the data of the first data flow and the data of the second data flow in dependence upon the determined at least one further resource configuration.

In some examples: the first resource configuration comprises a first periodic resource pattern; the second resource configuration comprises a second periodic resource pattern; and the at least one further resource configuration comprises at least one further periodic resource pattern.

In some examples, the first periodic resource pattern comprises a first configured grant, wherein the second periodic resource pattern comprises a second configured grant, wherein the at least one further periodic resource pattern comprises at least one further configured grant.

In some examples, the first periodic resource pattern, the second periodic resource pattern, and the at least one further periodic resource pattern comprises resources on which data is semi-persistently scheduled for transmission.

In some examples, the apparatus comprises a network side apparatus.

In some examples, the apparatus comprises a user equipment.

In some examples, the computer program comprising instructions for causing the apparatus to perform at least: receiving control information from a network side apparatus; and in response to the received control information, performing the determining that there is an at least partial overlap in time between a first allocation of the first resource configuration and a second allocation of the second resource configuration.

According to a fifteenth aspect, there is provided a non-transitory computer readable medium comprising program instructions for causing an apparatus to perform at least the following: transmitting a first data flow in resources of a first resource configuration; and transmitting a second data flow in resources of a second resource configuration; determining that there is an at least partial overlap in time between a first allocation of the first resource configuration and a second allocation of the second resource configuration; and in response to determining that there is the at least partial overlap, transmitting data of the first data flow and data of the second data flow in resources of at least one further resource configuration.

In some examples, the non-transitory computer readable medium comprising program instructions for causing an apparatus to perform at least the following transmitting the data of the first data flow in an allocation of a first of the at least one further resource configuration; and transmitting the data of the second data flow in the allocation of the first at least one further resource configuration.

In some examples, the frequency width of the allocation of the first at least one further resource configuration is greater than the frequency width of the first allocation and the frequency width second allocation.

In some examples, the transmitting the data of the first data flow in the allocation of the first of the at least one further resource configuration comprises transmitting the data of the first data flow in a first transport block, wherein the transmitting the data of the second data flow in the allocation of the first at least one further resource configuration comprises transmitting the data of the second data flow in the first transport block.

In some examples, the transmitting data of the first data flow and data of the second data flow in resources of at least one further resource configuration comprises transmitting data of the first data flow and data of the second data flow in a combination of resources of the first resource configuration and the second resource configuration.

In some examples, the non-transitory computer readable medium comprises program instructions for causing the apparatus to perform at least the following: determining that there is substantially a complete overlap in time between the first allocation and the second allocation; and in response to determining that there is substantially the complete overlap, performing the transmitting data of the first data flow and data of the second data flow in the combination of resources of the first resource configuration and the second resource configuration.

In some examples, the non-transitory computer readable medium comprises program instructions for causing the apparatus to perform at least the following: determining that there is a partial overlap in time between the first allocation and the second allocation; and in response to determining that there is the partial overlap, performing the transmission of the data of the first data flow and the data of the second data flow in the allocation beginning from a start in time of the second allocation, wherein the first allocation begins prior to the second allocation.

In some examples, the non-transitory computer readable medium comprises program instructions for causing the apparatus to perform at least the following: transmitting: the data of the first data flow in resources of a first of the at least one further period resource configuration; and the data of the second data flow in resources of a second of the at least one further resource configuration, wherein the second of the at least one further resource configuration comprises an allocation following an allocation of the first of the at least one further resource configuration.

In some examples, the non-transitory computer readable medium comprises program instructions for causing the apparatus to perform at least the following: determining that there is a partial overlap in time between the first allocation and the second allocation; and in response to determining that there is the partial overlap, performing the transmitting: the data of the first data flow in resources of the first of the at least one further period resource configuration; and the data of the second data flow in resources of the second of the at least one further resource configuration.

In some examples, the first of the at least one further resource configuration is configured with different parameters to the second of the at least one further resource configuration, wherein the parameters comprise at least one of: modulation and coding scheme; target code rate; target transport block size; frequency domain resources allocation; time domain resources allocation; block error rate target per transmission; reliability target per transmission; and quality of service requirements.

In some examples, the non-transitory computer readable medium comprises program instructions for causing the apparatus to perform at least the following: determining a modulation and coding scheme to use for transmitting data on the at least one further resource configuration in dependence upon at least one of: a modulation and coding scheme used for transmitting the first data flow in the resources of the first resource configuration; and a modulation and coding scheme used for transmitting the second data flow in the resources of the second resource configuration.

In some examples, the non-transitory computer readable medium comprises program instructions for causing the apparatus to perform at least the following: determining the at least one further resource configuration in dependence upon the first resource configuration and the second resource configuration.

In some examples, the first resource configuration comprises a first periodic resource pattern; the second resource configuration comprises a second periodic resource pattern; and the at least one further resource configuration comprises at least one further periodic resource pattern.

In some examples, the first periodic resource pattern comprises a first configured grant, wherein the second periodic resource pattern comprises a second configured grant, wherein the at least one further periodic resource pattern comprises at least one further configured grant.

In some examples, the first periodic resource pattern, the second periodic resource pattern, and the at least one further periodic resource pattern each comprise resources on which data is semi-persistently scheduled for transmission.

In some examples, the apparatus comprises a network side apparatus.

In some examples, the apparatus comprises a user equipment.

In some examples, the non-transitory computer readable medium comprises program instructions for causing the apparatus to perform at least the following: receiving control information from a network side apparatus; and in response to the received control information, performing the determining that there is an at least partial overlap in time between a first allocation of the first resource configuration and a second allocation of the second resource configuration.

According to a sixteenth aspect, there is provided a non-transitory computer readable medium comprises program instructions for causing an apparatus to perform at least the following: receiving a first data flow in resources of a first resource configuration; receiving a second data flow in resources of a second resource configuration; determining that there is an at least partial overlap in time between a first allocation of the first resource configuration and a second allocation of the second resource configuration; receiving data of the first data flow and data of the second data flow in resources of at least one further resource configuration; and in response to determining that there is the at least partial overlap, decoding the data of the first data flow and the data of the second data flow received in the resources of at least one further resource configuration.

In some examples, the non-transitory computer readable medium comprises program instructions for causing the apparatus to perform at least the following: receiving the data of the first data flow in an allocation of a first of the at least one further resource configuration; and receiving the data of the second data flow in the allocation of the first at least one further resource configuration.

In some examples, the frequency width of the allocation of the first at least one further resource configuration is greater than the frequency width of the first allocation and the frequency width of the second allocation.

In some examples, the receiving the data of the first data flow in the allocation of the first of the at least one further resource configuration comprises receiving the data of the first data flow in a first transport block, wherein the receiving the data of the second data flow in the allocation of the first at least one further resource configuration comprises receiving the data of the second data flow in the first transport block, the non-transitory computer readable medium comprises program instructions for causing the apparatus to perform at least the following, in response to determining that there is the at least partial overlap, decoding the first transport block.

In some examples, the receiving data of the first data flow and data of the second data flow in resources of at least one further resource configuration comprises receiving data of the first data flow and data of the second data flow in a combination of resources of the first resource configuration and the second resource configuration.

In some examples, the non-transitory computer readable medium comprises program instructions for causing the apparatus to perform at least the following: determining that there is substantially a complete overlap in time between the first allocation and the second allocation; and in response to determining that there is substantially the complete overlap, decoding the data of the first data flow and data of the second data flow received in the combination of resources of the first allocation and the second allocation.

In some examples, the non-transitory computer readable medium comprises program instructions for causing the apparatus to perform at least the following: receiving the data of the first data flow and the data of the second data flow in the allocation beginning from a start in time of the second allocation; determining that there is a partial overlap in time between the first allocation and the second allocation; and in response to determining that there is the partial overlap, decoding the data of the first data flow and the data of the second data flow received in the allocation beginning from the start in time of the second allocation, wherein the first allocation begins prior to the second allocation.

In some examples, the non-transitory computer readable medium comprises program instructions for causing the apparatus to perform at least the following: receiving and decoding: the data of the first data flow in resources of a first of the at least one further period resource configuration; and the data of the second data flow in resources of a second of the at least one further resource configuration, wherein the second of the at least one further resource configuration comprises an allocation following an allocation of the first of the at least one further resource configuration.

In some examples, the non-transitory computer readable medium comprises program instructions for causing the apparatus to perform at least the following: determining that there is a partial overlap in time between the first allocation and the second allocation; and in response to determining that there is the partial overlap, performing the decoding of: the data of the first data flow in resources of the first of the at least one further period resource configuration; and the data of the second data flow in resources of the second of the at least one further resource configuration.

In some examples, the first of the at least one further resource configuration is configured with different parameters to the second of the at least one further resource configuration, wherein the different parameters comprise at least one of: modulation and coding scheme; target code rate; target transport block size; frequency domain resources allocation; time domain resources allocation; block error rate target per transmission; reliability target per transmission; and quality of service requirements.

In some examples, the non-transitory computer readable medium comprises program instructions for causing the apparatus to perform at least the following: determining a modulation and coding scheme for use on the at least one further resource configuration in dependence upon at least one of: a modulation and coding scheme used for the first data flow in the resources of the first resource configuration; and a modulation and coding scheme used for the second data flow in the resources of the second resource configuration; and performing the decoding of the data of the first data flow and the data of the second data flow according to the determined modulation and coding scheme.

In some examples, the non-transitory computer readable medium comprises program instructions for causing the apparatus to perform at least the following: determining the at least one further resource configuration in dependence upon the first resource configuration and the second resource configuration; and performing the decoding of the data of the first data flow and the data of the second data flow in dependence upon the determined at least one further resource configuration.

In some examples: the first resource configuration comprises a first periodic resource pattern; the second resource configuration comprises a second periodic resource pattern; and the at least one further resource configuration comprises at least one further periodic resource pattern.

In some examples, the first periodic resource pattern comprises a first configured grant, wherein the second periodic resource pattern comprises a second configured grant, wherein the at least one further periodic resource pattern comprises at least one further configured grant.

In some examples, the first periodic resource pattern, the second periodic resource pattern, and the at least one further periodic resource pattern comprises resources on which data is semi-persistently scheduled for transmission.

In some examples, the apparatus comprises a network side apparatus.

In some examples, the apparatus comprises a user equipment.

In some examples, the non-transitory computer readable medium comprises program instructions for causing the apparatus to perform at least the following: receiving control information from a network side apparatus; and in response to the received control information, performing the determining that there is an at least partial overlap in time between a first allocation of the first resource configuration and a second allocation of the second resource configuration.

According to a seventeenth aspect, there is provided an apparatus comprising: at least one processor and at least one memory comprising code that, when executed by the at least one processor, causes the apparatus to perform: transmitting a first data flow in resources of a first resource configuration; and transmitting a second data flow in resources of a second resource configuration; determining that there is an at least partial overlap in time between a first allocation of the first resource configuration and a second allocation of the second resource configuration; and in response to determining that there is the at least partial overlap, transmitting data of the first data flow and data of the second data flow in resources of at least one further resource configuration.

In some examples, the at least one memory comprises code that, when executed by the at least one processor, causes the apparatus to perform transmitting the data of the first data flow in an allocation of a first of the at least one further resource configuration; and transmitting the data of the second data flow in the allocation of the first at least one further resource configuration.

In some examples, the frequency width of the allocation of the first at least one further resource configuration is greater than the frequency width of the first allocation and the frequency width second allocation.

In some examples, the transmitting the data of the first data flow in the allocation of the first of the at least one further resource configuration comprises transmitting the data of the first data flow in a first transport block, wherein the transmitting the data of the second data flow in the allocation of the first at least one further resource configuration comprises transmitting the data of the second data flow in the first transport block.

In some examples, the transmitting data of the first data flow and data of the second data flow in resources of at least one further resource configuration comprises transmitting data of the first data flow and data of the second data flow in a combination of resources of the first resource configuration and the second resource configuration.

In some examples, the at least one memory comprises code that, when executed by the at least one processor, causes the apparatus to perform: determining that there is substantially a complete overlap in time between the first allocation and the second allocation; and in response to determining that there is substantially the complete overlap, performing the transmitting data of the first data flow and data of the second data flow in the combination of resources of the first resource configuration and the second resource configuration.

In some examples, the at least one memory comprises code that, when executed by the at least one processor, causes the apparatus to perform: determining that there is a partial overlap in time between the first allocation and the second allocation; and in response to determining that there is the partial overlap, performing the transmission of the data of the first data flow and the data of the second data flow in the allocation beginning from a start in time of the second allocation, wherein the first allocation begins prior to the second allocation.

In some examples, the at least one memory comprises code that, when executed by the at least one processor, causes the apparatus to perform transmitting: the data of the first data flow in resources of a first of the at least one further period resource configuration; and the data of the second data flow in resources of a second of the at least one further resource configuration, wherein the second of the at least one further resource configuration comprises an allocation following an allocation of the first of the at least one further resource configuration.

In some examples, the at least one memory comprises code that, when executed by the at least one processor, causes the apparatus to perform determining that there is a partial overlap in time between the first allocation and the second allocation; and in response to determining that there is the partial overlap, performing the transmitting: the data of the first data flow in resources of the first of the at least one further period resource configuration; and the data of the second data flow in resources of the second of the at least one further resource configuration.

In some examples, the first of the at least one further resource configuration is configured with different parameters to the second of the at least one further resource configuration, wherein the parameters comprise at least one of: modulation and coding scheme; target code rate; target transport block size; frequency domain resources allocation; time domain resources allocation; block error rate target per transmission; reliability target per transmission; and quality of service requirements.

In some examples, the at least one memory comprises code that, when executed by the at least one processor, causes the apparatus to perform determining a modulation and coding scheme to use for transmitting data on the at least one further resource configuration in dependence upon at least one of: a modulation and coding scheme used for transmitting the first data flow in the resources of the first resource configuration; and a modulation and coding scheme used for transmitting the second data flow in the resources of the second resource configuration.

In some examples, the at least one memory comprises code that, when executed by the at least one processor, causes the apparatus to perform determining the at least one further resource configuration in dependence upon the first resource configuration and the second resource configuration.

In some examples, the first resource configuration comprises a first periodic resource pattern; the second resource configuration comprises a second periodic resource pattern; and the at least one further resource configuration comprises at least one further periodic resource pattern.

In some examples, the first periodic resource pattern comprises a first configured grant, wherein the second periodic resource pattern comprises a second configured grant, wherein the at least one further periodic resource pattern comprises at least one further configured grant.

In some examples, the first periodic resource pattern, the second periodic resource pattern, and the at least one further periodic resource pattern each comprise resources on which data is semi-persistently scheduled for transmission.

According to eighteenth aspect, there is provided a network side apparatus comprising the apparatus of the seventeenth aspect.

According to a nineteenth aspect, there is provided a user equipment comprising the apparatus of the seventeenth aspect.

In some examples, the at least one memory comprises code that, when executed by the at least one processor, causes the apparatus to perform receiving control information from a network side apparatus; and in response to the received control information, performing the determining that there is an at least partial overlap in time between a first allocation of the first resource configuration and a second allocation of the second resource configuration.

According to a twentieth aspect, there is provided an apparatus comprising: at least one processor and at least one memory comprising code that, when executed by the at least one processor, causes the apparatus to perform: receiving a first data flow in resources of a first resource configuration; receiving a second data flow in resources of a second resource configuration; determining that there is an at least partial overlap in time between a first allocation of the first resource configuration and a second allocation of the second resource configuration; receiving data of the first data flow and data of the second data flow in resources of at least one further resource configuration; and in response to determining that there is the at least partial overlap, decoding the data of the first data flow and the data of the second data flow received in the resources of at least one further resource configuration.

In some examples, the at least one memory comprises code that, when executed by the at least one processor, causes the apparatus to perform: receiving the data of the first data flow in an allocation of a first of the at least one further resource configuration; and receiving the data of the second data flow in the allocation of the first at least one further resource configuration.

In some examples, the frequency width of the allocation of the first at least one further resource configuration is greater than the frequency width of the first allocation and the frequency width of the second allocation.

In some examples, the receiving the data of the first data flow in the allocation of the first of the at least one further resource configuration comprises receiving the data of the first data flow in a first transport block, wherein the receiving the data of the second data flow in the allocation of the first at least one further resource configuration comprises receiving the data of the second data flow in the first transport block, the at least one memory comprises code that, when executed by the at least one processor, causes the apparatus to perform, in response to determining that there is the at least partial overlap, decoding the first transport block.

In some examples, the receiving data of the first data flow and data of the second data flow in resources of at least one further resource configuration comprises receiving data of the first data flow and data of the second data flow in a combination of resources of the first resource configuration and the second resource configuration.

In some examples, the at least one memory comprises code that, when executed by the at least one processor, causes the apparatus to perform: determining that there is substantially a complete overlap in time between the first allocation and the second allocation; and in response to determining that there is substantially the complete overlap, decoding the data of the first data flow and data of the second data flow received in the combination of resources of the first allocation and the second allocation.

In some examples, the at least one memory comprises code that, when executed by the at least one processor, causes the apparatus to perform: receiving the data of the first data flow and the data of the second data flow in the allocation beginning from a start in time of the second allocation; determining that there is a partial overlap in time between the first allocation and the second allocation; and in response to determining that there is the partial overlap, decoding the data of the first data flow and the data of the second data flow received in the allocation beginning from the start in time of the second allocation, wherein the first allocation begins prior to the second allocation.

In some examples, the at least one memory comprises code that, when executed by the at least one processor, causes the apparatus to perform receiving and decoding: the data of the first data flow in resources of a first of the at least one further period resource configuration; and the data of the second data flow in resources of a second of the at least one further resource configuration, wherein the second of the at least one further resource configuration comprises an allocation following an allocation of the first of the at least one further resource configuration.

In some examples, the at least one memory comprises code that, when executed by the at least one processor, causes the apparatus to perform: determining that there is a partial overlap in time between the first allocation and the second allocation; and in response to determining that there is the partial overlap, performing the decoding of: the data of the first data flow in resources of the first of the at least one further period resource configuration; and the data of the second data flow in resources of the second of the at least one further resource configuration.

In some examples, the first of the at least one further resource configuration is configured with different parameters to the second of the at least one further resource configuration, wherein the different parameters comprise at least one of: modulation and coding scheme; target code rate; target transport block size; frequency domain resources allocation; time domain resources allocation; block error rate target per transmission; reliability target per transmission; and quality of service requirements.

In some examples, the at least one memory comprises code that, when executed by the at least one processor, causes the apparatus to perform: determining a modulation and coding scheme for use on the at least one further resource configuration in dependence upon at least one of: a modulation and coding scheme used for the first data flow in the resources of the first resource configuration; and a modulation and coding scheme used for the second data flow in the resources of the second resource configuration; and performing the decoding of the data of the first data flow and the data of the second data flow according to the determined modulation and coding scheme.

In some examples, the at least one memory comprises code that, when executed by the at least one processor, causes the apparatus to perform determining the at least one further resource configuration in dependence upon the first resource configuration and the second resource configuration; and performing the decoding of the data of the first data flow and the data of the second data flow in dependence upon the determined at least one further resource configuration.

In some examples: the first resource configuration comprises a first periodic resource pattern; the second resource configuration comprises a second periodic resource pattern; and the at least one further resource configuration comprises at least one further periodic resource pattern.

In some examples, the first periodic resource pattern comprises a first configured grant, wherein the second periodic resource pattern comprises a second configured grant, wherein the at least one further periodic resource pattern comprises at least one further configured grant.

In some examples, the first periodic resource pattern, the second periodic resource pattern, and the at least one further periodic resource pattern comprises resources on which data is semi-persistently scheduled for transmission.

According to a twenty-first aspect, there is provided a network side apparatus comprising the apparatus of the twentieth aspect.

According to a twenty-second aspect, there is provided a user equipment comprising the apparatus of the twentieth aspect.

In some examples, the at least one memory comprises code that, when executed by the at least one processor, causes the apparatus to perform: receiving control information from a network side apparatus; and in response to the received control information, performing the determining that there is an at least partial overlap in time between a first allocation of the first resource configuration and a second allocation of the second resource configuration.

According to a twenty-third aspect, there is provided an apparatus comprising means for: transmitting a first data flow in resources of a first resource configuration; and transmitting a second data flow in resources of a second resource configuration, determining that there is an at least partial overlap in time between a first allocation of the first resource configuration and a second allocation of the second resource configuration; and, in response to determining that there is the at least partial overlap, transmitting data of the first data flow and data of the second data flow in a single transport block in combined resources of the first allocation and second allocation.

In some examples, the apparatus comprises means for determining a modulation and coding scheme to use for transmitting the single transport block in dependence upon at least one of: a modulation and coding scheme used for transmitting the first data flow in the resources of the first resource configuration; and a modulation and coding scheme used for transmitting the second data flow in the resources of the second resource configuration.

In some examples, the apparatus comprises means for receiving at least one of: an acknowledgement or a negative acknowledgment corresponding to the single transport block.

In some examples, the apparatus comprises means for: determining that there is substantially a complete overlap in time between the first allocation and the second allocation; and in response to determining that there is substantially the complete overlap, performing the transmitting data of the first data flow and data of the second data flow in the single transport block in combined resources of the first allocation and second allocation.

In some examples, the apparatus comprises means for: determining that there is frequency contiguity between resources of the first allocation and resources of the second allocation; and in response to determining that there is the frequency contiguity, performing the transmitting data of the first data flow and data of the second data flow in the single transport block in combined resources of the first allocation and second allocation.

In some examples, the apparatus comprises means for: determining that the apparatus comprises capabilities for non-contiguous allocations in the uplink; and in response to determining that the apparatus comprises capabilities for non-contiguous allocations in the uplink, performing the transmitting data of the first data flow and data of the second data flow in the single transport block in combined resources of the first allocation and second allocation.

In some examples, the first resource configuration comprises a first resource configuration; and the second resource configuration comprises a second resource configuration.

According to a twenty-fourth aspect, there is provided a user equipment comprising the apparatus of the twenty-third aspect.

In some examples, the apparatus comprises means for: receiving control information from the network side apparatus; and in response to the control information, performing the determining that there is the at least partial overlap in time between the first allocation of the first resource configuration and the second allocation of the second resource configuration.

According to a twenty-fifth aspect, there is provided a network side apparatus comprising the apparatus of the twenty-third aspect.

According to a twenty-sixth aspect, there is provided a method comprising: transmitting a first data flow in resources of a first resource configuration; and transmitting a second data flow in resources of a second resource configuration, determining that there is an at least partial overlap in time between a first allocation of the first resource configuration and a second allocation of the second resource configuration; and, in response to determining that there is the at least partial overlap, transmitting data of the first data flow and data of the second data flow in a single transport block in combined resources of the first allocation and second allocation.

In some examples, the method comprises: determining a modulation and coding scheme to use for transmitting the single transport block in dependence upon at least one of: a modulation and coding scheme used for transmitting the first data flow in the resources of the first resource configuration; and a modulation and coding scheme used for transmitting the second data flow in the resources of the second resource configuration.

In some examples, the method comprises receiving at least one of: an acknowledgement or a negative acknowledgment corresponding to the single transport block.

In some examples, the method comprises: determining that there is substantially a complete overlap in time between the first allocation and the second allocation; and in response to determining that there is substantially the complete overlap, performing the transmitting data of the first data flow and data of the second data flow in the single transport block in combined resources of the first allocation and second allocation.

In some examples, the method comprises: determining that there is frequency contiguity between resources of the first allocation and resources of the second allocation; and in response to determining that there is the frequency contiguity, performing the transmitting data of the first data flow and data of the second data flow in the single transport block in combined resources of the first allocation and second allocation.

In some examples, the method comprises: determining that the apparatus comprises capabilities for non-contiguous allocations in the uplink; and in response to determining that the apparatus comprises capabilities for non-contiguous allocations in the uplink, performing the transmitting data of the first data flow and data of the second data flow in the single transport block in combined resources of the first allocation and second allocation.

In some examples, the first resource configuration comprises a first resource configuration; and the second resource configuration comprises a second resource configuration.

According to a twenty-seventh aspect, there is provided a user equipment configured to perform the method of the twenty-sixth aspect.

In some examples, the method comprises: receiving control information from the network side apparatus; and in response to the control information, performing the determining that there is the at least partial overlap in time between the first allocation of the first resource configuration and the second allocation of the second resource configuration.

According to a twenty-eighth aspect, there is provided a network side apparatus configured to perform the method of the twenty-sixth aspect.

According to a twenty-ninth aspect, there is provided computer program comprising instructions for causing an apparatus to perform at least: transmitting a first data flow in resources of a first resource configuration; and transmitting a second data flow in resources of a second resource configuration, determining that there is an at least partial overlap in time between a first allocation of the first resource configuration and a second allocation of the second resource configuration; and, in response to determining that there is the at least partial overlap, transmitting data of the first data flow and data of the second data flow in a single transport block in combined resources of the first allocation and second allocation.

In some examples, the computer program comprises instructions for causing the apparatus to perform at least: determining a modulation and coding scheme to use for transmitting the single transport block in dependence upon at least one of: a modulation and coding scheme used for transmitting the first data flow in the resources of the first resource configuration; and a modulation and coding scheme used for transmitting the second data flow in the resources of the second resource configuration.

In some examples, the computer program comprises instructions for causing the apparatus to perform at least receiving at least one of: an acknowledgement or a negative acknowledgment corresponding to the single transport block.

In some examples, the computer program comprises instructions for causing the apparatus to perform at least: determining that there is substantially a complete overlap in time between the first allocation and the second allocation; and in response to determining that there is substantially the complete overlap, performing the transmitting data of the first data flow and data of the second data flow in the single transport block in combined resources of the first allocation and second allocation.

In some examples, the computer program comprises instructions for causing the apparatus to perform at least: determining that there is frequency contiguity between resources of the first allocation and resources of the second allocation; and in response to determining that there is the frequency contiguity, performing the transmitting data of the first data flow and data of the second data flow in the single transport block in combined resources of the first allocation and second allocation.

In some examples, the computer program comprises instructions for causing the apparatus to perform at least: determining that the apparatus comprises capabilities for non-contiguous allocations in the uplink; and in response to determining that the apparatus comprises capabilities for non-contiguous allocations in the uplink, performing the transmitting data of the first data flow and data of the second data flow in the single transport block in combined resources of the first allocation and second allocation.

In some examples, the first resource configuration comprises a first resource configuration; and the second resource configuration comprises a second resource configuration.

In some examples, the apparatus comprises a user equipment.

In some examples, the computer program comprises instructions for causing the apparatus to perform at least: receiving control information from the network side apparatus; and in response to the control information, performing the determining that there is the at least partial overlap in time between the first allocation of the first resource configuration and the second allocation of the second resource configuration.

In some examples, the apparatus comprises a network side apparatus.

According to a thirtieth aspect, there is provided a non-transitory computer readable medium comprising program instructions for causing an apparatus to perform at least the following: transmitting a first data flow in resources of a first resource configuration; and transmitting a second data flow in resources of a second resource configuration, determining that there is an at least partial overlap in time between a first allocation of the first resource configuration and a second allocation of the second resource configuration; and, in response to determining that there is the at least partial overlap, transmitting data of the first data flow and data of the second data flow in a single transport block in combined resources of the first allocation and second allocation.

In some examples, the non-transitory computer readable medium comprises program instructions for causing the apparatus to perform at least the following: determining a modulation and coding scheme to use for transmitting the single transport block in dependence upon at least one of: a modulation and coding scheme used for transmitting the first data flow in the resources of the first resource configuration; and a modulation and coding scheme used for transmitting the second data flow in the resources of the second resource configuration.

In some examples, the non-transitory computer readable medium comprises program instructions for causing the apparatus to perform at least the following receiving at least one of: an acknowledgement or a negative acknowledgment corresponding to the single transport block.

In some examples, the non-transitory computer readable medium comprises program instructions for causing the apparatus to perform at least the following: determining that there is substantially a complete overlap in time between the first allocation and the second allocation; and in response to determining that there is substantially the complete overlap, performing the transmitting data of the first data flow and data of the second data flow in the single transport block in combined resources of the first allocation and second allocation.

In some examples, the non-transitory computer readable medium comprises program instructions for causing the apparatus to perform at least the following: determining that there is frequency contiguity between resources of the first allocation and resources of the second allocation; and in response to determining that there is the frequency contiguity, performing the transmitting data of the first data flow and data of the second data flow in the single transport block in combined resources of the first allocation and second allocation.

In some examples, the non-transitory computer readable medium comprises program instructions for causing the apparatus to perform at least the following: determining that the apparatus comprises capabilities for non-contiguous allocations in the uplink; and in response to determining that the apparatus comprises capabilities for non-contiguous allocations in the uplink, performing the transmitting data of the first data flow and data of the second data flow in the single transport block in combined resources of the first allocation and second allocation.

In some examples, the first resource configuration comprises a first resource configuration; and the second resource configuration comprises a second resource configuration.

In some examples, the apparatus comprises a user equipment.

In some examples, the non-transitory computer readable medium comprises program instructions for causing the apparatus to perform at least the following: receiving control information from the network side apparatus; and in response to the control information, performing the determining that there is the at least partial overlap in time between the first allocation of the first resource configuration and the second allocation of the second resource configuration.

In some examples, the apparatus comprises a network side apparatus.

According to a thirtieth-first aspect, there is provided an apparatus comprising: at least one processor and at least one memory comprising code that, when executed by the at least one processor, causes the apparatus to perform: transmitting a first data flow in resources of a first resource configuration; and transmitting a second data flow in resources of a second resource configuration, determining that there is an at least partial overlap in time between a first allocation of the first resource configuration and a second allocation of the second resource configuration; and, in response to determining that there is the at least partial overlap, transmitting data of the first data flow and data of the second data flow in a single transport block in combined resources of the first allocation and second allocation.

In some examples, the at least one memory comprises code that, when executed by the at least one processor, causes the apparatus to perform: determining a modulation and coding scheme to use for transmitting the single transport block in dependence upon at least one of: a modulation and coding scheme used for transmitting the first data flow in the resources of the first resource configuration; and a modulation and coding scheme used for transmitting the second data flow in the resources of the second resource configuration.

In some examples, the at least one memory comprises code that, when executed by the at least one processor, causes the apparatus perform: receiving at least one of: an acknowledgement or a negative acknowledgment corresponding to the single transport block.

In some examples, the at least one memory comprises code that, when executed by the at least one processor, causes the apparatus perform: determining that there is substantially a complete overlap in time between the first allocation and the second allocation; and in response to determining that there is substantially the complete overlap, performing the transmitting data of the first data flow and data of the second data flow in the single transport block in combined resources of the first allocation and second allocation.

In some examples, the at least one memory comprises code that, when executed by the at least one processor, causes the apparatus perform: determining that there is frequency contiguity between resources of the first allocation and resources of the second allocation; and in response to determining that there is the frequency contiguity, performing the transmitting data of the first data flow and data of the second data flow in the single transport block in combined resources of the first allocation and second allocation.

In some examples, the at least one memory comprises code that, when executed by the at least one processor, causes the apparatus perform: determining that the apparatus comprises capabilities for non-contiguous allocations in the uplink; and in response to determining that the apparatus comprises capabilities for non-contiguous allocations in the uplink, performing the transmitting data of the first data flow and data of the second data flow in the single transport block in combined resources of the first allocation and second allocation.

In some examples, the first resource configuration comprises a first resource configuration; and the second resource configuration comprises a second resource configuration.

In some examples, the apparatus comprises a user equipment.

In some examples, the at least one memory comprises code that, when executed by the at least one processor, causes the apparatus perform: receiving control information from the network side apparatus; and in response to the control information, performing the determining that there is the at least partial overlap in time between the first allocation of the first resource configuration and the second allocation of the second resource configuration.

In some examples, the apparatus comprises a network side apparatus.

According to a thirty-second aspect, there is provided an apparatus configured to perform the actions of any method as described above.

According to a thirty-third aspect, there is provided a computer program comprising program instructions for causing a computer to perform any method as described above.

According to a thirty-fourth aspect, there is provided a computer program product stored on a medium that may cause an apparatus to perform any method as described herein.

According to a thirty-fifth aspect, there is provided an electronic device that may comprise apparatus as described herein.

According to a thirty-sixth aspect, there is provided a chipset that may comprise an apparatus as described herein.

BRIEF DESCRIPTION OF FIGURES

Some example embodiments will now be described in further detail, by way of example only, with reference to the following examples and accompanying drawings, in which.

DETAILED DESCRIPTION

Figure 1:
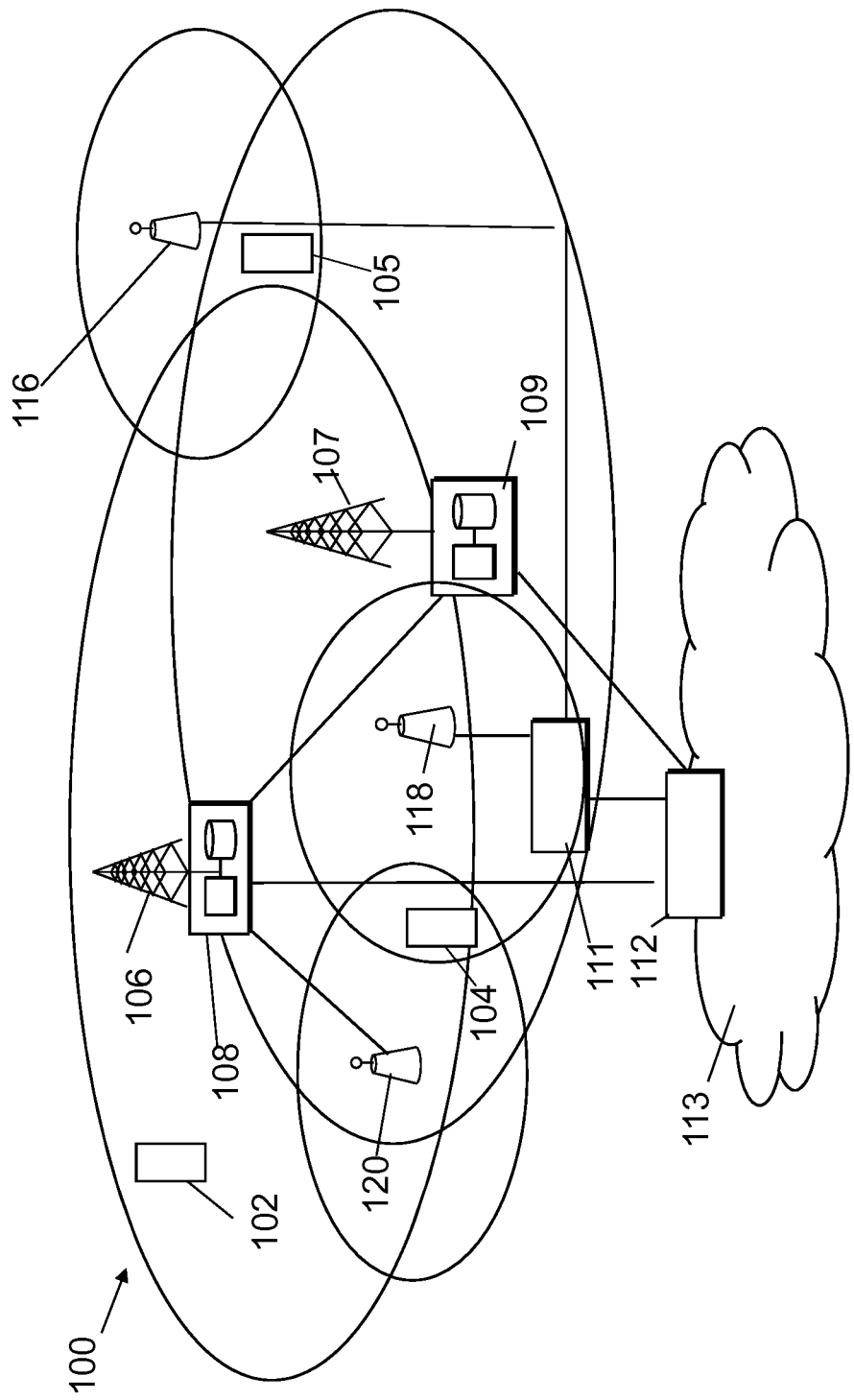
FIG. 1 shows a schematic example of a communication system.

In the following, certain exemplifying embodiments are explained with reference to a wireless communication system serving devices adapted for wireless communication. Before explaining in detail, example embodiments, certain general principles of a communication system, a communication device and a control apparatus are briefly explained with reference to FIGS. 1 to 3 to assist in understanding the technology underlying the described invention.

In a wireless system, at least a part of the communications between at least two stations occurs over wireless interfaces. Examples of wireless systems include public land mobile networks (PLMN), satellite based communication systems and different wireless local networks, for example, wireless local area networks (WLAN). A local area wireless networking technology allowing devices to connect to a data network is known by the tradename Wi-Fi (or WiFi). Wi-Fi is often used synonymously with WLAN.

Wireless systems can be divided into cells, and are therefore often referred to as cellular systems. A user can access a communication system by means of an appropriate communication device or terminal. A communication device of a user is often referred to as user equipment (UE) or user apparatus. A communication device is provided with an appropriate signal receiving and transmitting apparatus for enabling communications, for example, enabling access to a communication network or enabling communications directly with other users. The communication device may access a carrier provided by a station, for example a base station of a cell, and transmit and/or receive communications on the carrier.

A communication system and associated devices typically operate in accordance with a given standard or specification, which sets out what the various entities associated with the system are permitted to do and how that should be achieved. Communication protocols and/or parameters, which shall be used for the connection are also typically defined. An example of standardized communication system architectures is the long-term evolution (LTE) of the Universal Mobile Telecommunications System (UMTS) radio-access technology. The LTE is being standardized by the 3rd Generation Partnership Project (3GPP). The LTE employs the Evolved Universal Terrestrial Radio Access Network (E-UTRAN) access. Further development of LTE is sometimes referred to as LTE Advanced (LTE-A). The various development stages of 3GPP specifications are referred to as releases. In this description, 3GPP release versions are distinguished by the acronym "Rel-nn".

In addition to LTE evolution, 3GPP is also standardizing a new radio generation (5G) called new radio (NR). NR does not require backwards compatibility with LTE. NR includes a non-standalone mode in which there is tight interworking between the RAT (radio access technology) and LTE. NR also includes a standalone mode which does not involve such tight interworking.

The various development stages of the 3GPP specifications are referred to as releases. The next upcoming release is the 3GPP release 16. The release 16 includes work items relating to Industrial Internet of Things (IIoT) and ultra-reliable low-latency communications (URLLC) enhancements. The work items consider use cases demanding very stringent reliability and latency targets, e.g. time sensitive network (TSN) use cases. The approved work items on this scope can be found in 3GPP documents RP-190728 and RP-190726.

In a wireless communication system 100, such as that shown in FIG. 1, wireless communication devices, for example, user equipment (UEs) 102, 104, 105 are provided wireless access via at least one wireless transmitting and/or receiving wireless infrastructure node or point. The UEs 102, 104, 105 may be IIoT devices configured to exchange data in a TSN. The wireless infrastructure node or point could be, for example, a base station or an eNodeB (eNB), or in a 5G system a Next Generation NodeB (gNB), or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller. Other examples of radio access systems comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1, base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111, whilst station 120 connects via the controller apparatus 108. In some example embodiments, the smaller stations may not be provided.

Figure 2:
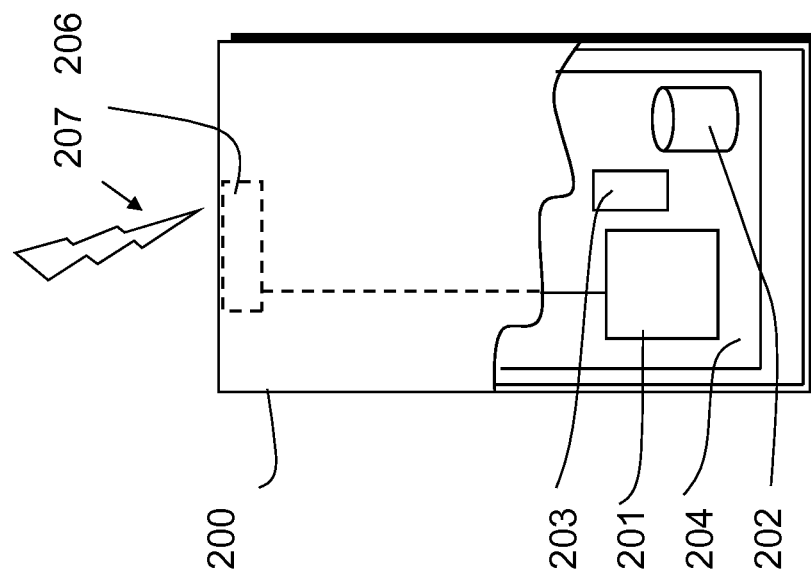
FIG. 2 shows an example of a communication device.

A possible wireless communication device, such as UE, will now be described in more detail with reference to FIG. 2 showing a schematic, partially sectioned view of a communication device 200. Such a communication device 200 is often referred to as an endpoint device. An appropriate communication device 200 may be provided by any device capable of sending and receiving radio signals.

A communication device 200 may be, for example, a mobile device, that is, a device not fixed to a particular location. Alternatively, communication device 200 may be a stationary device. The communication device 200 may need human interaction for communication, or may not need human interaction for communication. The communication device 200 may also be referred to hereunder as a terminal, or simply as an apparatus for accessing a network.

The communication device 200 may receive signals over an air or radio interface 207 via appropriate apparatus for receiving radio signals and may transmit signals via appropriate apparatus for transmitting radio signals. In FIG. 2, transceiver apparatus is designated schematically by block 206. The transceiver apparatus 206 may be provided, for example, by means of a radio part and associated antenna arrangement. The antenna arrangement may be arranged internally or externally to the communication device 200.

The communication device 200 is typically provided with at least one data processing entity 201, at least one memory 202 and other possible components 203 for use in the software and hardware aided execution of tasks it is designed to perform, including control of, access to, and communications with, access systems and other communication devices. The data processing, storage and other relevant control apparatus can be provided on an appropriate circuit board and/or in chipsets. This feature is denoted by reference 204. Furthermore, the wireless communication device 200 may comprise appropriate connectors (either wired or wireless) to other devices and/or for connecting external accessories. The communication devices 102, 104, 105 may access the communication system based on various access techniques.

Figure 3:
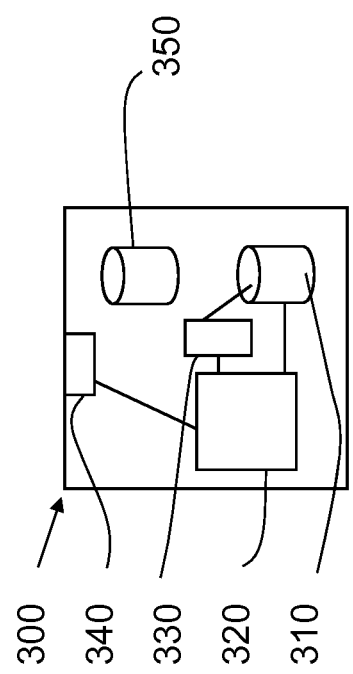
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, (e) node B or 5G gNB, or a node of a core network such as an MME, S-GW or AMF, or a server or host. The method may be implemented in a single control apparatus or across more than one control apparatus. The control apparatus 300 may be integrated with or external to a node or module of a core network or RAN. In some example embodiments, base stations comprise a separate control apparatus unit or module. In other example embodiments, the control apparatus 300 can be another network element such as a radio network controller or a spectrum controller. In some example embodiments, each base station may have such a control apparatus 300 as well as such a control apparatus 300 being provided in a radio network controller. The control apparatus 300 can be arranged to provide control on communications in the service area of the system. The control apparatus 300 comprises at least one random access memory 310, at least one read only memory 350, at least one data processing unit 320, 330 and an input/output interface 340. Via the interface, the control apparatus can be coupled to a receiver and a transmitter of the base station. The receiver and/or the transmitter may be implemented as a radio front end or a remote radio head.

Architectures for wireless communications systems are standardized by the 3rd Generation Partnership Project (3GPP). One 3GPP based development is often referred to as the long term evolution (LTE) of the Universal Mobile Telecommunications System (UMTS) radio-access technology. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced NodeBs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Another example of a 3GPP development is 5G. Network architecture in 5G is similar to that of the LTE-advanced. Changes to the network architecture from LTE/LTE-advanced depend on the need to support various radio technologies, provide finer Quality of Service (QoS) support, and meet certain on-demand requirements for example QoS levels to support Quality of Experience (QoE) from a user point of view. Also network aware services and applications, and service and application aware networks are bringing further changes to the architecture. Those are related to Information Centric Network (ICN) and User-Centric Content Delivery Network (UC-CDN) approaches. 5G can make use of multiple input-multiple output (MIMO) antennas, many more base stations or nodes than LTE (a so-called small cell concept), including macro sites operating in co-operation with smaller stations. 5G can also employ a variety of radio technologies for better coverage and enhanced data rates.

The base stations/access points in 5G may be referred to as gNB.

The 5G system enables expansion of International Mobile Telecommunications (IMT) that go beyond those of IMT-2000 and IMT-Advanced mobile broadband (MBB) service, and also enabling new services and use cases to be addressed. At least during the initial stages of implementation, cells provided by 5G apparatuses may operate using 4G infrastructure, depending on the service being provided. For example, a 5G network connection may be used for improving on data throughput, relative to 4G, whilst a 4G connection is used for non-data operations, such as control communications between a user equipment and the network. Network cells operating in such a manner, utilising both types of network, are known as non-standalone cells.

In communication systems, one challenge that may arise is how to assign resources for transmissions in a limited resource space. This challenge may arise in the case that a device is configured to make transmissions for a plurality of data flows in different resource configurations. In such a case, transmissions for multiple data flows may be scheduled on overlapping resources, resulting in collisions between the two flows.

Figure 5:
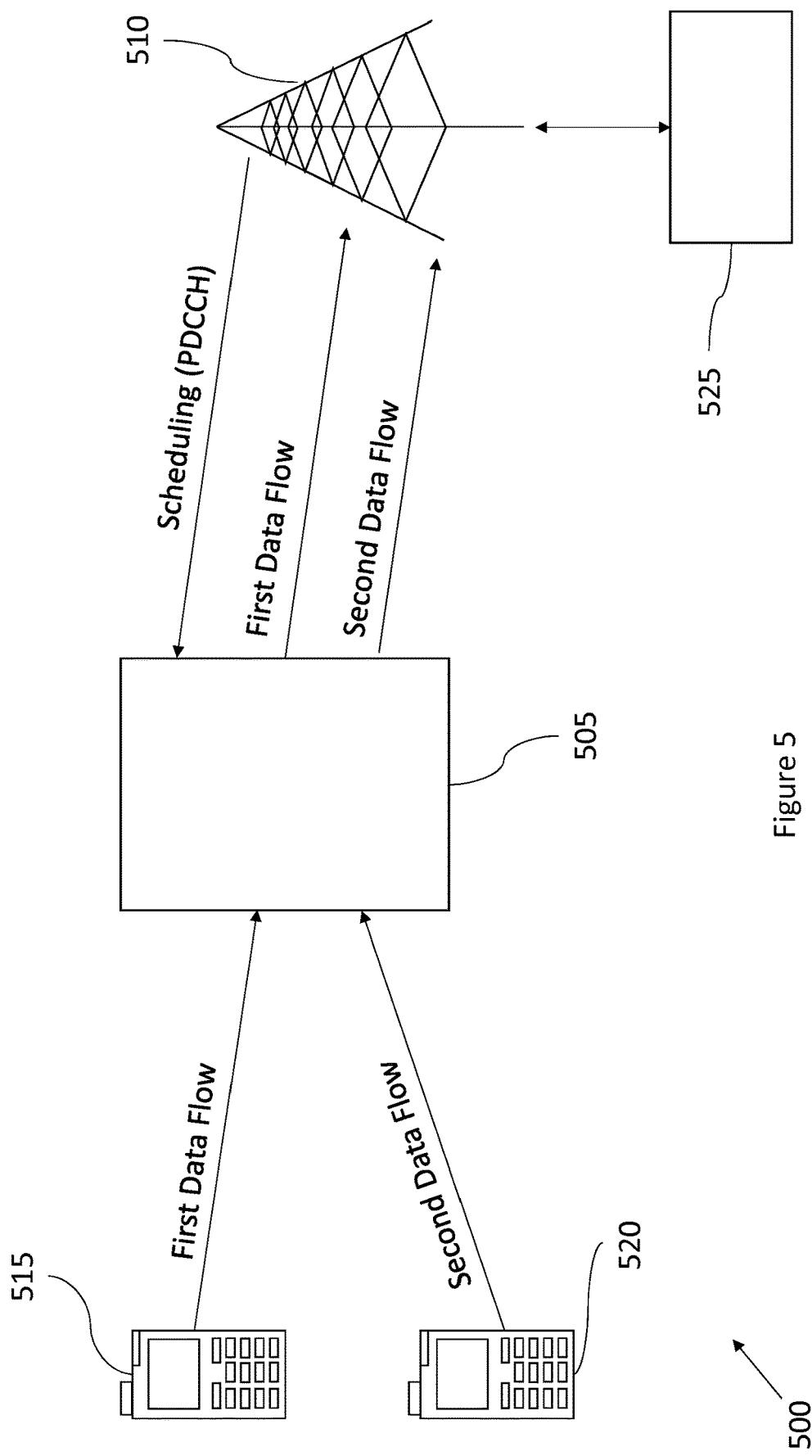
FIG. 5 illustrates a schematic example of a time sensitive network communication system.

Reference is made to FIG. 5, which illustrates an example of a communication system 500 in which a device 505 is configured to transmit data belonging to a first data flow and data belong to a second data flow in the uplink direction towards base station 510. The data of each flow is transmitted in in a Physical Uplink Shared Channel (PUSCH). The first data flow is received from a first further communication device 515. The second data flow is received from a second further communication device 520. The device 505 may be a wireless Ethernet hub. Such a wireless Ethernet hub may connect two segments of a time sensitive network (TSN). Alternatively, the device 505 may be another form of device, such as a mobile phone. The device 505 may also combine the functions of Ethernet hub and the UE of a 3GPP network and may interface with both TSN network segment and/or TSN end stations on one side and with 3GPP network on the other side. Although, the device 505 is shown as receiving the first and second data flows from further communication devices 515, 520, in other cases, the device 505 could originate these data flows, or could receive them from a single device or different multiple devices.

The base station 510 is configured to determine the resources on which the device 505 is using for transmission of the data flows, and attempt to decode the data received on those resources.

The communication system 500 may be a TSN, in which the devices participating in the communication have a common understanding of time. In a TSN, all of the frames of the data flows are transmitted on a schedule provided to the devices in the network by a central controller (e.g. Central User Configurator (CUC)). In New Radio Industrial IoT studies, QoS and Scheduling enhancements for Time Sensitive Network (TSN) flows are being considered. One typical kind of TSN flows are periodic. In Annex A, assumptions regarding such period flows in TSN are detailed.

The communication system 500 also includes a controller apparatus 525 that controls the base station 510. The controller apparatus 525 controls the base station 510 to cause the base station 510 to perform transmissions (e.g. of scheduling information). The controller apparatus 525 receives communications (e.g. the first and second data flow) that are received at the base station 510. The controller apparatus 525 may be located in the core network (CN) and may be implemented as one central apparatus or its functionality may be distributed over several apparatus. The controller apparatus 525 may be part of the base station 510 and/or provided by a separate entity such as a Radio Network Controller.

As illustrated, the device 505 is required to carry a plurality of data flows simultaneously. These data flows may have different traffic characteristics and requirements. Transmissions for each of the data flows must be scheduled. As shown in FIG. 5, such scheduling may involve the base station 510 sending scheduling information to the device 505. Such scheduling information is transmitted to the device 505 in a Physical Downlink Control Channel (PDCCH).

Different types of scheduling may be used. One type of scheduling is dynamic scheduling in which the resources for transmission are allocated dynamically by the network. If dynamic scheduling is applied, the device 505 requires an UL grant received in the PDCCH in order to transmit data in particular UL resources on PUSCH. One disadvantage of this type of scheduling is the overhead involved in repeatedly providing scheduling information in the downlink.

Some types of scheduling involve allocating resources that are periodically used for transmission. For example, a set of resources may be allocated for use by the device 505 in making periodic transmissions of data of a first data flow on the uplink without requiring a new assignment of resources from the network. A different set of resources may be periodically allocated for use by the device 505 in transmitting data of the second data flow on the uplink without requiring a new assignment of resources from the network. Such resources are referred to herein as periodic resources. Periodic resources are arranged in a periodic resource configuration/pattern. Therefore, a periodic resource configuration comprises periodic resources. Each grouping of resources along the time domain is referred to as an allocation of the periodic resource configuration.

One way in which resources may be periodically allocated is through the use of a configured grant (CG). In NR, a configured grant is used for allocating periodic resources for uplink data transmission from the device 505. In this case, the base station 510 sends in the downlink, an allocation of configured grant resources for use by one or more devices. Each device may then utilise the allocated resources of the configured grant when it has data available it its transmission buffers. The device 505, for example, transmits data to the base station 510 in periodic configured grant resources indicated to it by the base station 510. By allocating configured grant resources for use by more than one device, the proportion of wasted transmission resources is lower.

Figure 5A:
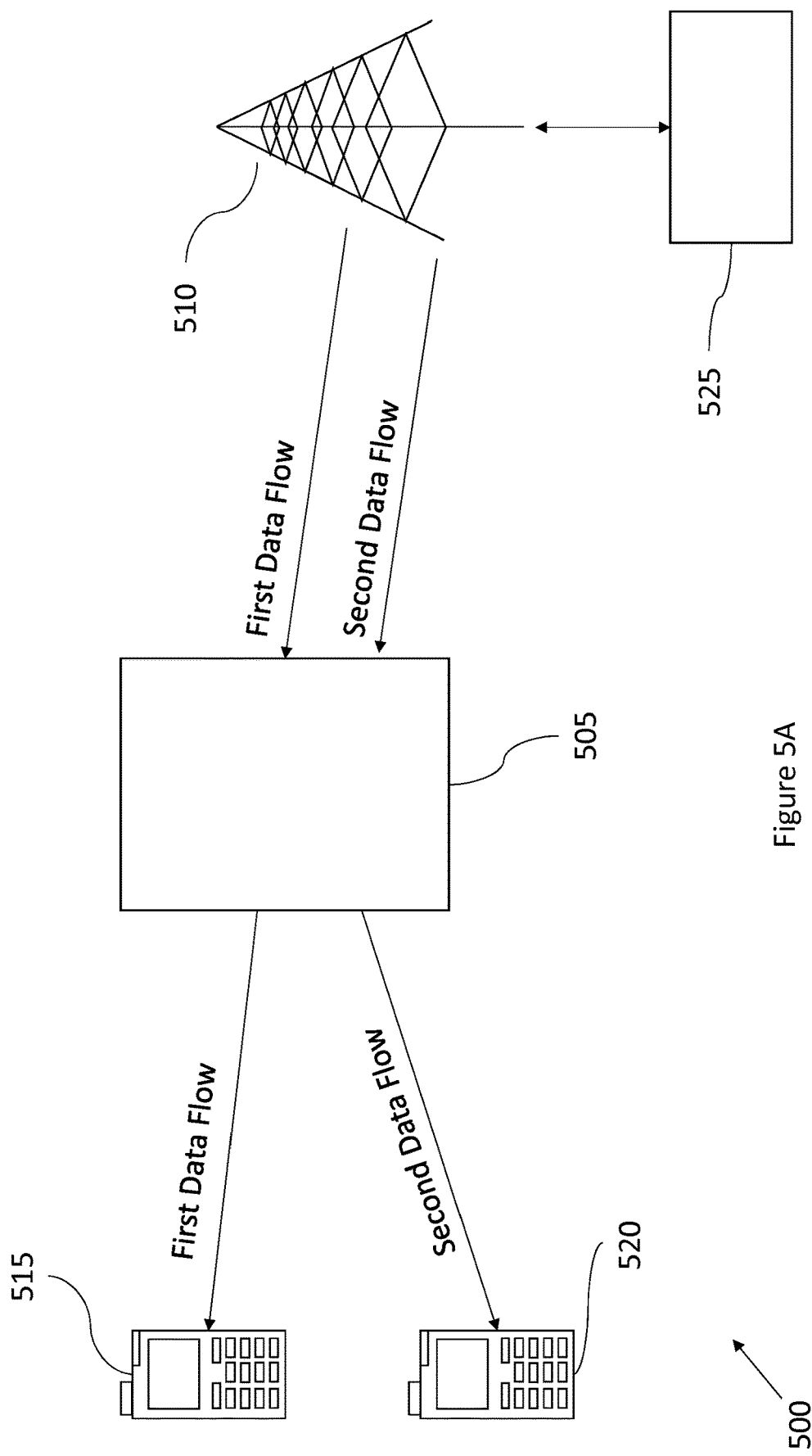
FIG. 5A illustrates a schematic example of a time sensitive network communication system.

Periodic resources may be used for transmissions in the downlink as well as transmissions in the uplink. Reference is made to FIG. 5A, which illustrates an example of the communication system 500 in which the base station 510 is configured to transmit data belonging to a first data flow and data belong to a second data flow in the downlink direction towards device 505. The data of each flow is transmitted in in a Physical Downlink Shared Channel (PDSCH). The first data flow is forwarded by the device 505 to the first further communication device 515. The second data flow is forwarded by the device 505 to a second further communication device 520. Although, the device 505 is shown as forwarding the first and second data flows to further communication devices 515, 520, in other cases, the device 505 could terminate these data flows, or could transmit them to a single device or different multiple devices.

The device 505 is configured to determine the resources on which the base station 510 is using for transmission of the data flows, and attempt to decode the data on those resources.

One way in which resources may be periodically allocated in the downlink is through the use of semi-persistent scheduling (SPS). In NR, semi-persistent scheduling is used for allocating periodic resources for downlink data reception at the device 510. In semi-persistent scheduling, the base station 510 transmits data to the device 505 in the allocated periodic resources.

One problem that arises from the use of resource configurations (such as the periodic resource patterns used for SPS or CG) for transmission of different data flows by the device 505 or by the base station 510 is that some of the allocated resources in the different resource configurations may collide in time.

Figure 6:
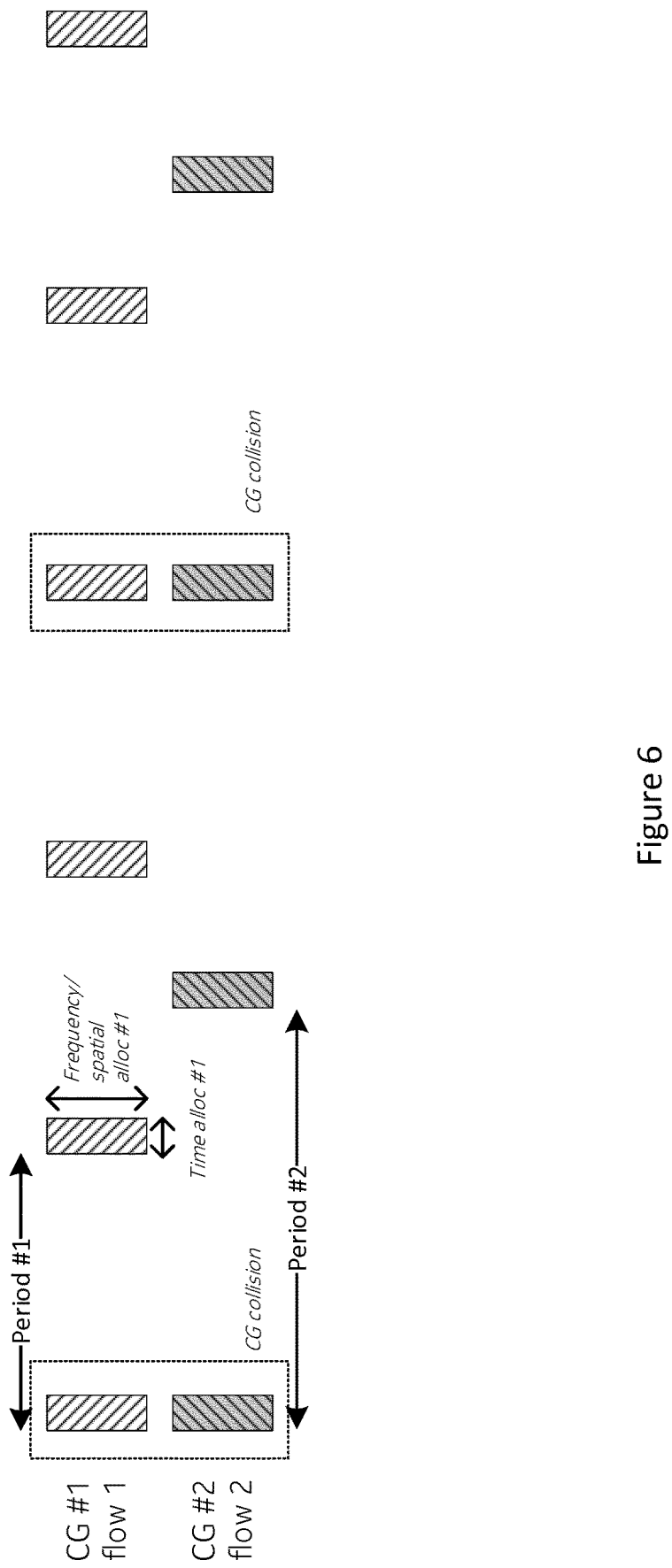
FIG. 6 illustrates an example of the transmission of data flows in resource configurations.

Reference is made to FIG. 6, which illustrates an example of how resources may be allocated in resource configurations for use by different data flows. In this example, a first resource configuration is shown as a first configured grant (CG #1), whereas a second resource configuration is shown as a second configured grant (CG #2). Although the resource configurations are shown as configured grants, in other examples the allocations could use another form of scheduling (e.g. semi-persistent scheduling). The resource configurations show may be used for transmission by any form of apparatus, e.g. a device 505 transmitting in the uplink or a base station 510 transmitting in the downlink.

The first data flow is transmitted on the allocations of the first resource configuration. The first resource configuration is a periodic resource pattern having a first period (labelled as Period #1). Therefore, a transmission of data of the first data flow is allowed on the allocations of the first resource configuration every time Period #1. The second data flow is transmitted on the allocations of the second resource configuration. The second resource configuration is a periodic resource pattern having a second period (labelled as Period #2). Therefore, a transmission of data of the second data flow is allowed on the allocations of the second periodic resource configuration every time Period #2.

At some time instances, an overlap/collision in the time domain occurs between the resources allocated for transmitting data of the first data flow and the resources allocated for transmitting data of the second data flow. These events are shown in FIG. 6 as "CG collision". This is a problem, since there is no technique known for enabling an apparatus to handle two independent PUSCH transmissions (i.e. "dual-PUSCH") at the same time and handle the corresponding Hybrid Automatic Repeat Request (HARQ) process for two overlapping allocations.

One proposal for addressing the problem discussed above is to dynamically allocate resources for transmitting data when conflicts arise. However, a drawback with this proposal is that conflicts are likely to be common and persist over minutes and hours and, therefore, dynamic allocations would be frequently required. Frequent use of dynamic allocations is undesirable due to the overhead involved on the control channels in dynamically allocating resources.

Another proposal to address the problem is to over-dimension and divide the allocations of resources to always be able to carry the flows even if they collide. For example, in FIG. 6, this could be achieved by replacing both the first and the second resource configurations with a single resource configuration having a shorter period and a greater frequency width. Both the first and the second data flow would then be transmitting in this single larger set of resources. One disadvantage of this proposal is the large overhead involved. If this proposal were applied to the example in FIG. 6, it would result in at least 200% of the resources going unused as only a fraction of the resources would be used for transmitting data of both of the flows. Furthermore, with this proposal, the configurations can get quite complicated when the periods of data transmission for the flows are not a multiple of each other (as in FIG. 6) and when there are different shifting time-domains controlling different resource configurations.

Another proposal to address the problem is to perform time shifting of one of the resource configurations. However, this may be challenging to handle in a multi-user environment. Furthermore, one data flow may receive suboptimal allocation (e.g. receiving reduced Packet Delay Budget or higher application jitter) of resource.

Another proposal to address the problem is to map the (self-decodable) transport blocks of a data flow to more than one of the resource configurations. The use of multiple sets of resource configurations is proposed so as to reduce frame alignment delay (e.g. each set of periodically allocated resources has a different time offset and a transport block is transmitted on the first available set of periodically resources). However, this mapping of transport blocks of a data flow to multiple such sets of resource configurations may also be performed for repetition purposes. For example, by transmitting the same transport block in each of a set of resource configurations, the transport block is in principle decodable from each set of resources. Since the transport block is self-decodable from any of the resource configurations, even if collisions occur between different allocations, the receiver of the transmissions will be able decode the transport block. However, this proposal would result in a lower coding rate. Furthermore, it does not address the problem in the case that a transport block is not self-decodable from a single set of resources, but is mapped over several sets of resources, hence requiring reliable transmission for each of the sets of resources.

According to example embodiments of the application, an apparatus configured to transmit a plurality of data flows is provided. The apparatus may comprise the communication device 505 illustrated in FIG. 5 and be configured to transmit the plurality of data flows in the uplink. The apparatus may comprise the base station 510 illustrated in FIG. 5A (or another network side piece of apparatus, e.g. a control apparatus for the base station) and be configured to transmit the plurality of data flows in the downlink. The apparatus is configured to transmit a first data flow in resources of a first resource configuration. The apparatus is configured to transmit a second data flow on resources of a second resource configuration. The first resource configuration and second resource configuration may be referred to as original resource configurations. At least one further resource configuration (which may be referred to as a collision dependent resource configuration) is defined to handle collisions between the resources of the first resource configuration and the resource of the second resource configuration. A mode in which the further resource configuration is used for transmission is defined. This mode is not active (or valid) in the case in which there is no overlap in the time domain between the first and second resource configurations. However, the mode is active (or valid) when an overlap between at least some of the first and second resources is determined by the apparatus. When the mode is active/valid, the apparatus is configured to transmit at least some data of the first data flow and at least some data of the second data flow in the further resource configuration.

The further resource configuration, therefore, is a special resource configuration that is only active/valid at times when an overlap between the first resources and the second resources is determined by the apparatus. When data from the first and second data flow is transmitted in allocations of the further resource configuration, the allocations of the further resource configuration substitute for the overlapping allocations in the first and second resource configurations. Therefore, the allocations in the first and second resource configurations which overlap with each other are replaced.

The further resource configuration may be a periodic resource pattern comprising allocations repeating in the time domain according to a certain period.

The apparatus may determine that there is the overlap in the time domain autonomously, by examining the first and second resource configurations. Alternatively, the apparatus may determine that there is the overlap in the time domain in response to receiving such an indication. For example, a device (e.g. device 505) may receive control information from the network side apparatus. This control information indicates to the device that a transmission in the collision dependent resources is to be performed instead of in the overlapping allocations of the original resource configurations.

According to example embodiments, there is also provided a receiving apparatus that receives the first and second data flow and attempts to decode the data. This receiving apparatus may be the device 505 receiving data in the downlink or may be a network side apparatus, such as base station 510, receiving data in the uplink. The receiving apparatus is configured to determine collisions between the resources of the first resource configuration and the resources of the second resource configuration. In response to determining the collisions, the receiving apparatus is configured to search for data on the at least one further resource configuration (a collision dependent resource configuration). The receiving apparatus then decodes the data received on the at least one further resource configuration. Therefore, the receiving apparatus is configured to anticipate the transmissions that will be made on the collision dependent resource configuration due to the collisions and decode the data transmitted in the collision dependent resource configuration.

In some example embodiments, the device 505 sends to the network side apparatus an indication of its capability to transmit on the collision dependent resources. The network side apparatus may use this indication to receive and decode data sent from the device 505 when a collision occurs between the original resource configurations.

In some examples embodiments, the transmitting device (either device 505 or network side apparatus) may determine the collision dependent resources in dependence upon the original resource configurations. In other examples embodiments, the transmitting device may receive this information from a control apparatus. For example, the device 505 may receive from the network side apparatus an information element (IE) indicating the collision dependent resources. Additionally or alternatively, the IE may comprise parameters used for transmission in the collision dependent resources, such as an indication of the MCS to be used by the device 505 when transmitting in the collision dependent resources.

In some example embodiments, the further resource configuration comprises a combination of the physical resources of the overlapping allocations from the first and second resource configurations. In this case, for each allocation in the further resource configuration, a single transport block is formed comprising data of the first and second data flows. This single transport block is transmitted in the associated allocation of the further resource configuration. This mode may be referred to as the Single-PUSCH auto-combining mode, since the resources from the first and second original resources are combined to form the collision dependent resources.

In some example embodiments, the Single-PUSCH-auto-combining mode may be used as a standalone mode independently of the use of a new collision dependent resource configuration. In this case, the data of the first and second data flow may be transmitting in the allocations from the first and second resources configurations that overlap in the time domain. Example embodiments achieve this by transmitting the data of the first and second data flow in a single transport block in the combined resources of the overlapping allocations of the first and second resource configurations. In some example embodiments, multiple collision dependent resource configurations may be activated to handle a collision between two original resource configurations. This may be used when the allocations of the original resources configurations only partially overlap in time with one another.

Embodiments extend to the use of such further resource configurations to handle overlaps between multiple resource configurations. For example, the apparatus may be arranged to transmit a third data flow in third resources arranged in a third resource configuration. A second further resource configuration may then be used to perform transmissions of data when allocations of the third resource configuration overlap with allocations of the first resource configuration. Furthermore, a third further resource configuration may be used to perform transmissions of data when allocations of the third resource configuration overlap in time with both allocations of the second resource configuration and allocations of the first resource configuration.

Some example embodiments may be implemented in a time sensitive network or in a 5G network integrated into or interfacing with a time sensitive network. In this case, the first data flow and second data flow comprise time sensitive network communications.

Example embodiments will now be explained in more detail with reference to FIGS. 7 and 8.

Figure 7:
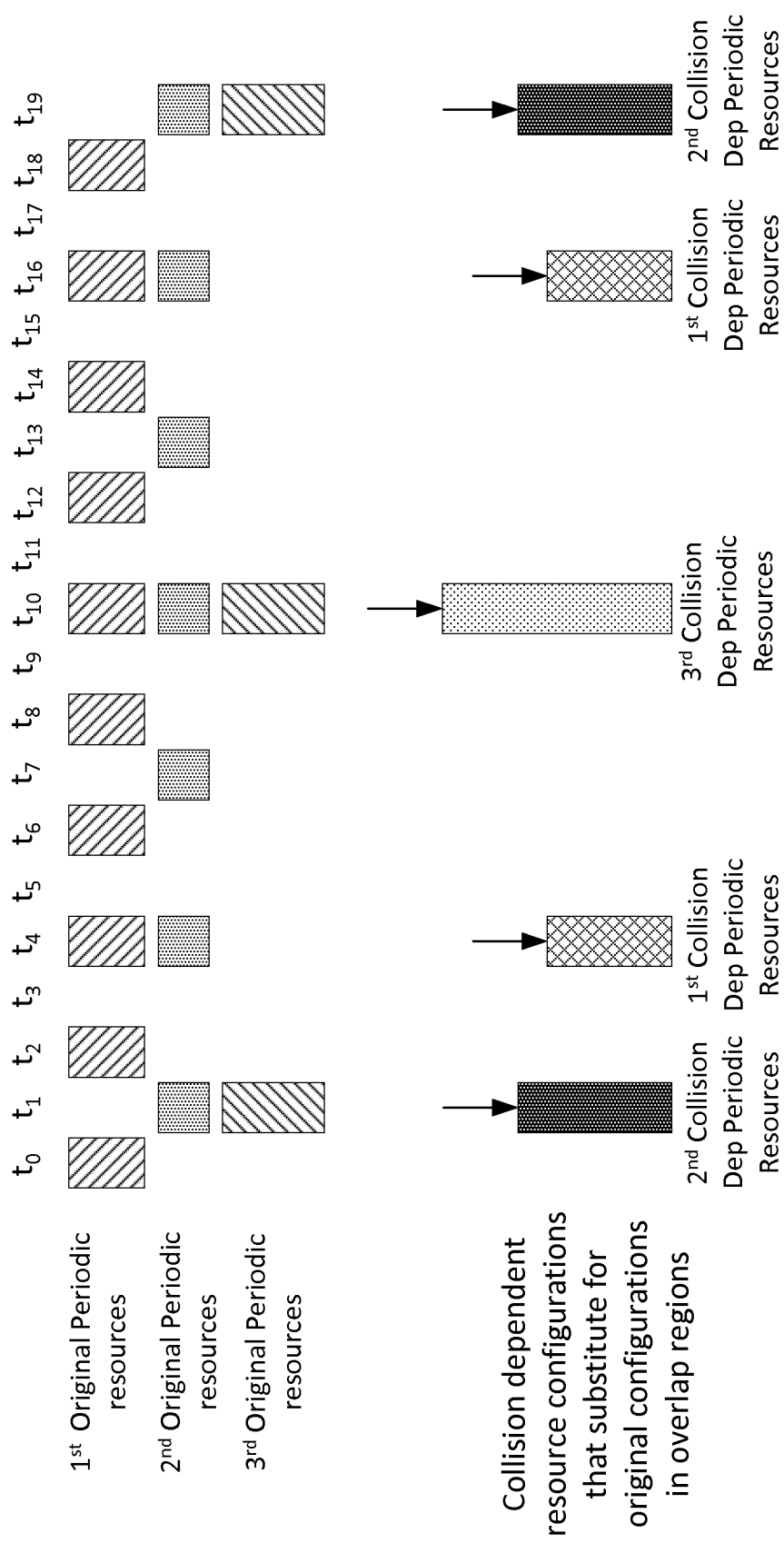
FIG. 7 illustrates an example of the transmission of data flows in resource configurations with substitute configurations to be used in case of collisions.

Reference is made to FIG. 7, which illustrates an example in which a first data flow is transmitted in a first original resource configuration (comprising first original resources) and a second data flow is transmitted in a second original resource configuration (comprising second original resources). The Figure also shows that a third data flow is transmitted in a third original resource configuration (i.e. in third original resources). The Figure shows collision dependent resource configurations (comprising collision dependent resources) that are used in the case of any overlap in the time domain between any of the first, second, and third resource configurations. All of the original and collision dependent resource configurations shown may be periodic resource patterns comprising allocations that repeat periodically. The data flows in the example of FIG. 7 are transmitting by an apparatus, which may be device (e.g. device 505) transmitting in the uplink or a network side apparatus (e.g. base station 510) transmitting in the downlink.

As shown, when the first original resource configuration does not overlap in time with the second or third original resource configurations, the collision dependent resource configurations are unused for transmission. In this case, data of the first data flow that is scheduled for transmission, is transmitted using the resources of the first original resource configuration. This occurs for example, at times $t_0$, $t_2$, $t_6$, $t_8$, $t_{12}$, $t_{14}$, and $t_{18}$. At these times, the allocations of the first original resource configuration do not overlap in the time domain with allocations of the second original resource configuration or third original resource configuration and, therefore, transmissions are made in the relevant allocations of the first original resource configuration.

As also shown in FIG. 7, there are times when the first original resources do overlap in the time domain with other original resources. For example, allocations of the first original resource configuration overlap with allocations of the second original resource configuration at times $t_4$, $t_{16}$. Therefore, the first collision dependent resource configuration is active and, at these times, the transmitting apparatus transmits data of the first data flow and the second data flow in the allocations of the first collision dependent resource configuration. As shown, the first further resource configuration is not used otherwise.

As shown, when the second original resources do not overlap in time with the first or third original resources, the collision dependent resource configurations are unused for transmission. In this case, the data of the second data flow that is scheduled for transmission at those times, is transmitted using the second original resources. This occurs for example, at times $t_7$, $t_{13}$. At these times, the allocations of the second original resource configuration do not overlap in the time domain with the allocations of the first or third original resource configurations, and data of the second data flow is transmitted in the relevant allocations of the second original resource configuration.

As also shown in FIG. 7, there are times when the second original resources do overlap in the time domain with other resource configurations. The case of overlap with only the first resource configurations has been discussed above already, leading to transmission of the first and second data flow on resources of the first further resource configuration. As a further example, allocations of the second original resource configuration overlap in time with allocations of the third original resource configuration at times $t_1$, and $t_{19}$. At these times, the apparatus transmits data of the second data flow and the third data flow in the allocations of the second collision dependent resource configuration. Furthermore, an allocation of the second original resource configuration overlaps in time with allocations of the first original resource configuration and the third original resource configuration at time $t_{10}$. During the overlap between allocations of the first original resource configuration, the second original resource configuration, and the third original resource configuration, the transmitting apparatus transmits data of the first data flow, second data flow and the third data flow in allocations of the third collision dependent resource configuration.

In some example embodiments, data that would be transmitted in a transport block of the first original resource configuration and data that would be transmitted in a transport block of the second original resource configuration are both transmitted together in a single transport block in an allocation of the collision dependent resource configuration. The transport block size (TBS) of this single transport block may be equal to the sum of the sizes (TBS1 and TBS2) of the two transport blocks that would be sent in allocations of the first original resource configuration and in the second original resource configuration (i.e. new TBS=TBS1+ TBS2). Alternatively, the apparatus may perform additional prioritisation or filtering rules to determine how to construct the new transport block to be sent in an allocation of the collision dependent resource configuration. The transport block size (new TBS) of the single transport block sent in the allocation of the collision dependent resource configuration may be smaller than the sum of the transport block size (TBS1) of transport blocks sent in allocations of the first original resource configuration and the transport block size (TBS2) of transport blocks sent in allocations of the second original resource configuration (i.e. new TBS<TBS1+ TBS2). The collision dependent resource configuration used for sending the transport block may have a logical channel prioritisation (LCP) restriction that is relaxed to allow both the first and second data flows to be mapped to resources of the collision dependent resource configuration. This may be achieved by explicitly configuring the LCP restrictions for the collision dependent resource configuration. Alternatively, the LCP restrictions could be inherited from the first and second original resources configurations in such a way that both the first and second data flows are transmitted in the collision dependent resource configuration.

In some example embodiments, an allocation of the collision dependent resource configurations comprises a combination of the resources of the overlapping allocations of the first and second original resource configurations. For example, at time $t_4$, when a transmission of data of the first data flow and the second data flow is made, the data is transmitted in an allocation of the collision dependent resource configuration. This allocation comprises the frequency resources of both the allocation of the first original resource configuration at time $t_4$ and the allocation of the second original resource configuration at time $t_4$. In these combined resources, a single transport block is transmitted. The single transport block comprises data from the first data flow and data from the second data flow. Therefore, a single transmission is done over the joint resources, this single transmission carrying data from both the first and second data flows.

Since the data from the first and second data flows is transmitted using a single transport block, the HARQ feedback process is carried out for the single transport block. Therefore, an ACK or NACK is sent by the base station to the transmitting apparatus following the transmission of the single transport block. This indicates to the apparatus whether or not the single transport block was successfully decoded by the receiver of the transport block.

This mode of operation, in which a single transport block is sent for the data in the first data flow and second data flow in combined resources may be referred to as the Single-PUSCH auto-combining mode ("Combi-PUSCH"). This mode is useful for the cases where allocations of the colliding original resource configurations are fully overlapping in time and have the same transmission duration. Therefore, the apparatus may be configured to apply this mode in response to determining that allocations of the original resource configurations are fully overlapping in time and have the same transmission duration. Furthermore, this mode may be applied in dependence upon the presence of frequency contiguity of the combined physical resources. Whether this mode is applied may depend on the capability of the transmitting apparatus. This mode may be applied to comply with potential device RF impairments. Therefore, both the nature of the original resource configurations (i.e. whether or not there is any frequency/spatial domain overlap) and the apparatus's capabilities for performing non-contiguous allocations in uplink shall be used to determine whether or not the single-PUSCH auto-combining mode is viable, and therefore, whether or not it is to be applied. For example, the apparatus may determine to not combine the resources of the first and second original resource configurations into a single transport block in the case that there is frequency/spatial domain overlap between the first and second original resource configurations. Furthermore, the apparatus may determine to not combine the resources of the first and second original resource configurations into a single transport block in the case that the apparatus is unable to perform non-contiguous transmissions in the uplink.

Therefore, the Single-PUSCH auto-combining mode discussed above may be useful for the case in which overlapping allocations are different in their frequency and spatial allocations, but they all have the same time-duration and starting symbol meaning that colliding allocations can be mapped to a single allocation comprising combined resources.

The modulation and coding scheme (MCS) that is used for transmitting data using the collision dependent resource configurations may differ from the MCS/s used for transmitting data using the original resources configurations. For example, the MCS used to transmit data using the first collision dependent resource configuration may be different to at least one of the MCS/s that are used to transmit data using the first and second original resource configurations. Network rules are used to determine which MCS to use for the collision dependent resource configurations. The network rules determine which MCS to use for collision dependent resource configurations in dependence upon the MCS/s used for transmitting data using the colliding original resource configurations. The network rules are applied by the apparatus to determine which MCS to use when transmitting data. Alternatively, the apparatus may determine which MCS to use for collision dependent resource configurations in dependence upon the MCS/s used for the colliding original resource configurations. For example, the apparatus determines the MCS used to transmit data using the first collision dependent resource configuration in dependence upon the MCS/s that are used to transmit data using the first and second original resource configurations. The apparatus determines the MCS that is used to transmit data using the first collision dependent resource configuration in dependence upon the MCS/s that are used to transmit data using the first and second original resource configurations. The apparatus then transmits the data using the determined MCS. In the case that the apparatus transmits a single transport block with the data from the first and second data flow, the single transmit block is transmitted using this determined MCS.

The receiving apparatus is configured to determine the modulation and coding scheme that is used to transmit the data in the collision dependent resources or in the single transport block dependence upon the MCS/s used for transmitting data using the colliding original resource configurations as discussed in the previous paragraph. The receiving apparatus is configured to then decode the received data using the determined MCS.

In some example embodiments, a single coded transport block is mapped over a plurality of collision dependent resource configurations. In this case, the apparatus is configured to transmit a transport block in resources of a first collision dependent resource configuration and to transmit the same transport block in resources of the second collision dependent resource configuration. This is performed in some example embodiments, since the transport block is not self-decodable from a single collision dependent resource configuration. Therefore, the aggregated resources are considered when mapping the transport block to a single time.

In some example embodiments, allocations of the original resources configurations overlap in time only partially. This may be a result of different periodicities and/or offsets associated with the original resource configurations.

According to example embodiments, the apparatus may transmit the data of the first and second data flows in two separate collision dependent resource configurations. The apparatus may perform this transmission in two separate collision dependent resource configuration when an allocation of the first original resource configuration does not completely overlap in the time domain with an allocation of the second original resource configuration. A first of these collision dependent resource configurations is used for transmission of data of the first data flow. A second of these collision dependent resource configurations is used for transmission of data of the second data flow.

According to example embodiments, when allocations of the first and second original resource configurations do not overlap completely in the time domain, another approach is to use a single collision dependent resource configuration to transmit the data of the first and second data flow, but with allocations of this single collision resource configuration delayed until the start of the later of the corresponding overlapping allocations of the first and second resource configurations.

Figure 8:
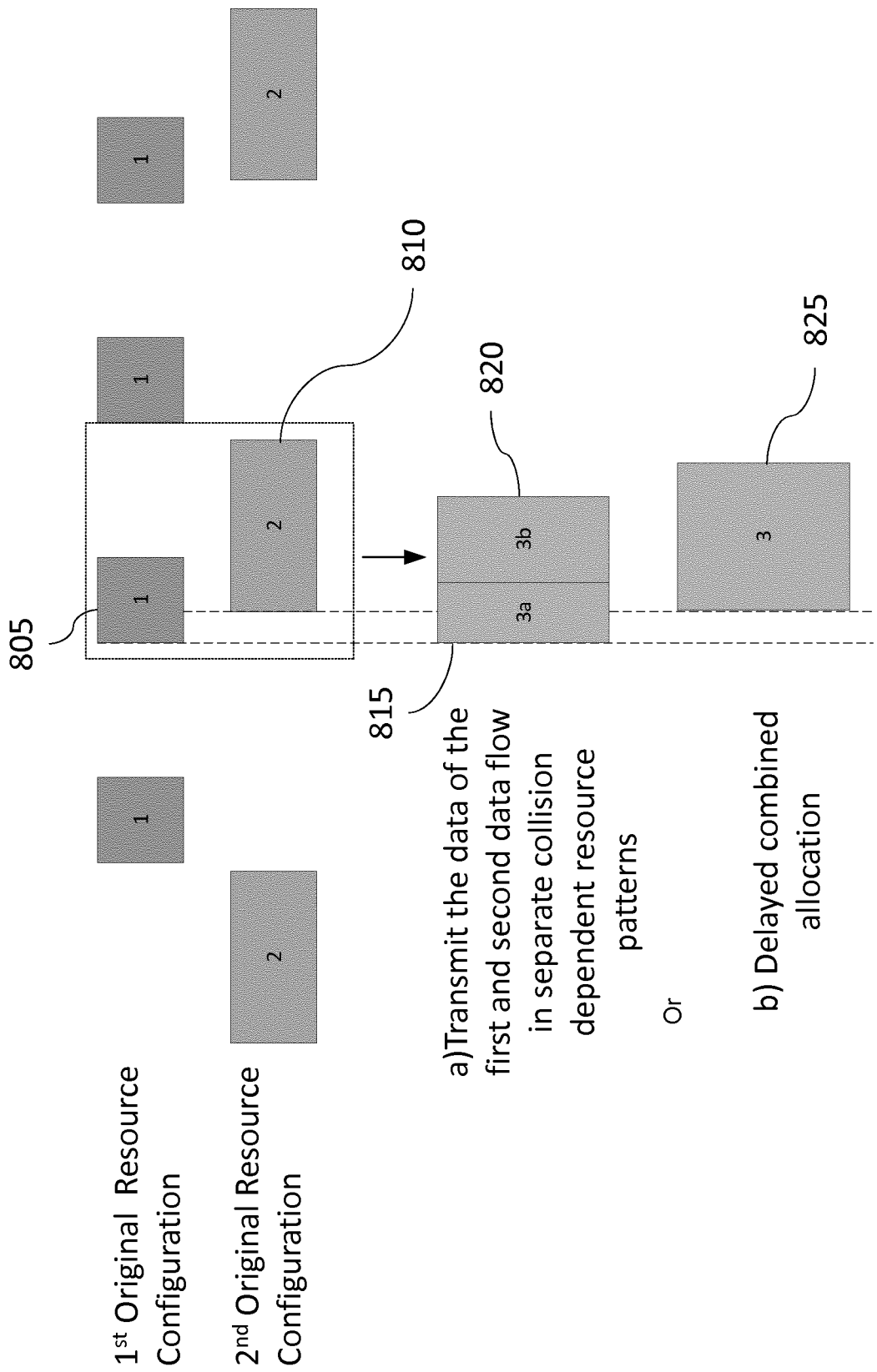
FIG. 8 illustrates an example of the transmission of data flows in resource configurations with substitute configurations for use in case of partial overlaps.

Reference is made to FIG. 8, which illustrates the transmission of data in at least one collision dependent resource configuration in the case that allocations of the first and second original resource configurations are not completely overlapping in time. FIG. 8 shows a first original resource configuration used for transmitting data of the first data flow and a second original resource configuration used for transmitting data of the second data flow. As shown, the periods and offsets of the first original resource configuration and the second original resource configuration are such that the allocations do not perfectly overlap in time. The first original resource configuration includes an allocation 805 that overlaps partially with an allocation 810 of the second original resource configuration. In accordance with example embodiments of the application, in response to determining the overlap, the apparatus determines to transmit the data of the first and second data flow in at least one collision dependent resource configuration.

In some example embodiments, as shown, the data is transmitted in two separate further collision dependent resource configurations. FIG. 8 illustrates an allocation 815 of a first collision dependent resource configuration and an allocation 820 of a second collision dependent resource configuration. The data of the first data flow, which would be transmitted in the allocation 805 of the first original resource configuration, in response to the apparatus detecting the overlap, is transmitted by the apparatus in the allocation 815 of the first collision dependent resource configuration. The data of the second data flow, which would be transmitted in the allocation 810 of the second original resource configuration, in response to the apparatus detecting the overlap, is transmitted by the apparatus in the allocation 820 of the second collision dependent resource configuration.

As shown in FIG. 8, there is no overlap in the time domain between the allocation 815 of the first collision dependent resource configuration and the allocation 820 of the second collision dependent resource configuration. Furthermore, the total transmission time for the allocations 815, 820 in the first and second collision dependent resource configurations is less than the total transmission time for the allocations 805, 810 in the first and second original resource configurations. This is achieved by increasing the use of resources in the frequency domain compared to the original resource configurations. In other words, the allocation 815 of the first collision dependent resource configuration has a greater frequency bandwidth compared to the allocation 805 of the first original resource configuration. This allows the same amount of data to be transmitted in reduced time. Similarly, the allocation 820 of the second collision dependent resource configuration has a greater frequency bandwidth compared to the allocation 810 of the second original resource configuration. This allows the same amount of data to be transmitted in reduced time.

The use of two collision dependent resource configurations for transmitting data of the first and second data flows, may be especially attractive if the allocation 810 of the second original resource configuration has a much larger duration than the allocation 805 of the first original resource configuration. This then prevents the delivery of the data from the second data flow from suffering a larger delay/jitter.

Furthermore, the use of two collision dependent resource configurations for transmitting data of the first and second data flows has the advantage of allowing for separate adjustments of parameters, e.g. BLER/reliability targets per transmission, in case the two data flows have very different QoS requirements. Transmissions using the first collision dependent resource configuration comprising the allocation 815 and the second collision dependent resource configuration comprising the allocation 820 may be transmitted according to different parameters, the parameters comprising: at least one of block error rate (BLER); reliability target per transmission; and QoS requirements.

As shown in FIG. 8, in some example embodiments, data from the first and second data flows may be transmitted in a single collision dependent resource configuration. An allocation 825 of the single collision dependent resource configuration in shown in FIG. 8. Data of the first and second data flow is transmitting in this combined allocation 825. This allocation 825 is delayed, in that the transmission of data in the allocation 825 does not begin until the start of the allocation 810 in the second original resource configuration. The starting time of the grant (related PUSCH) for the allocation 825 is configured to be the same as the starting time of the grant for the allocation 810.

The total transmission time for the allocations 825 is less than the total transmission time for the allocations 805, 810 in the first and second original resource configurations. This is achieved by increasing the use of resources in the frequency domain compared to the allocations 805, 810 of the original resource configurations. In other words, the allocation 825 uses more resources in the frequency domain compared to the allocations 805, 810 of the first and second original resource configurations. This allows the same amount of data to be transmitted in reduced time.

The example embodiments so far described have mostly focused on the role of the transmitting apparatus in determining on which resources to transmit. However, the above described teaching is equally applicable to the activity of the receiving apparatus when determining on which resources transmission will be made and performs the decoding of data it received on these resources in response. Therefore, references in the description to an apparatus transmitting data on particular resources using particular techniques (e.g. transmission using a particular MCS) may be understood to also disclose a receiving apparatus receiving and decoding the data transmitted on particular resources using those particular techniques.

Figure 9:
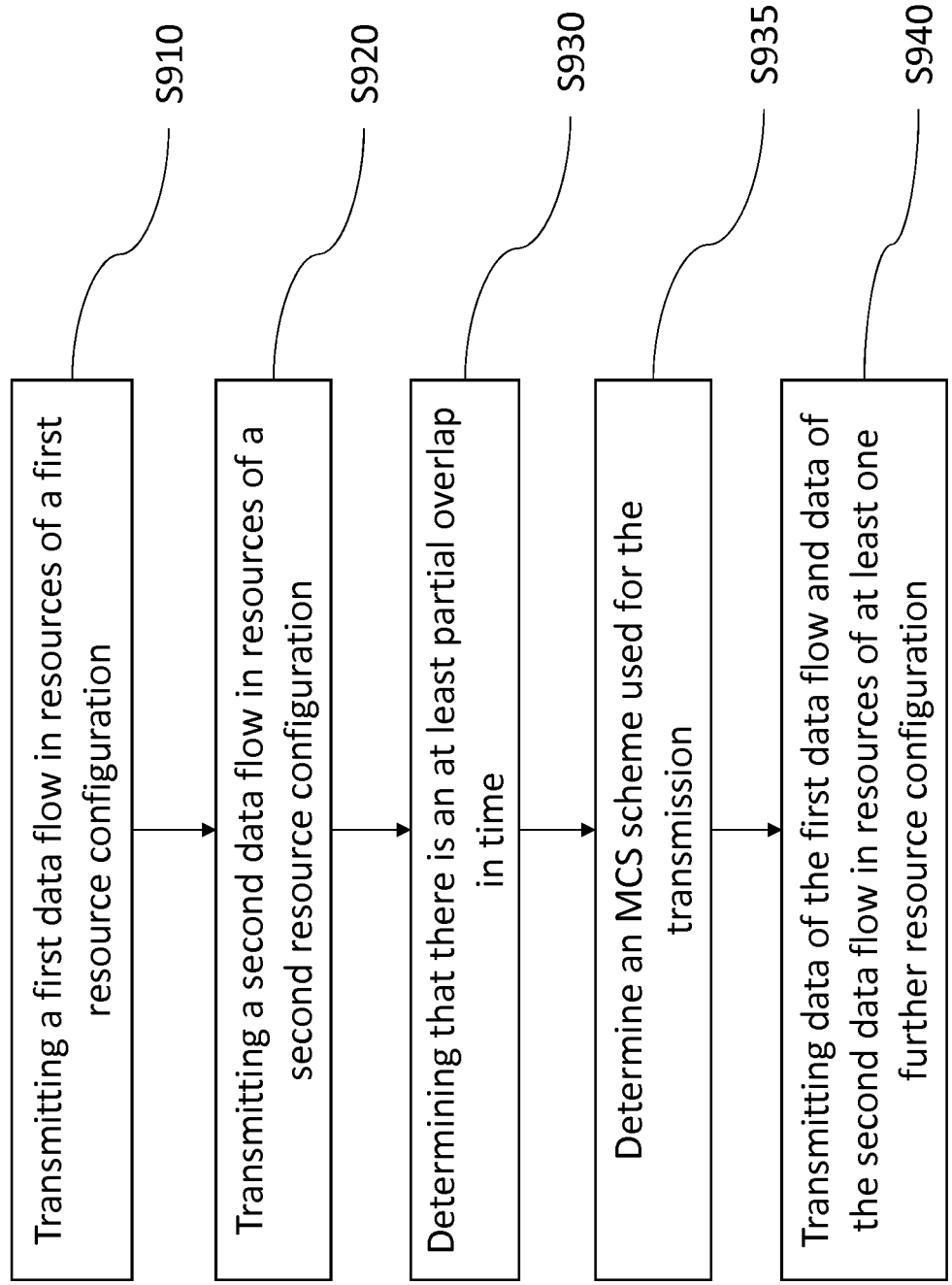
FIG. 9 illustrates an example of a method that may be performed in a transmitting apparatus.

Reference is made to FIG. 9, which illustrates an example of a method 900 that may be performed in a transmitting apparatus according to example embodiments of the application. The transmitting apparatus may be device 505 or a network side apparatus, such as base station 510 or control apparatus 525.

At S910, the transmitting apparatus transmits a first data flow in resources of a first resource configuration.

At S920, the transmitting apparatus transmits a second data flow in resources of a second resource configuration.

At S930, the transmitting apparatus determines that there is an at least partial overlap in time between a first allocation of the first resource configuration and a second allocation of the second resource configuration.

At S935, the transmitting apparatus determines the MCS scheme that will be used for the transmission of data in the collision dependent resource configuration. The transmitting apparatus may determine this MCS in dependence upon at least one of the MCSs used for transmitting data in the original resource configuration.

At S940, the transmitting apparatus transmits, in response to determining that there is the at least partial overlap, data of the first data flow and data of the second data flow in resources of the at least one further resource configuration.

Figure 10:
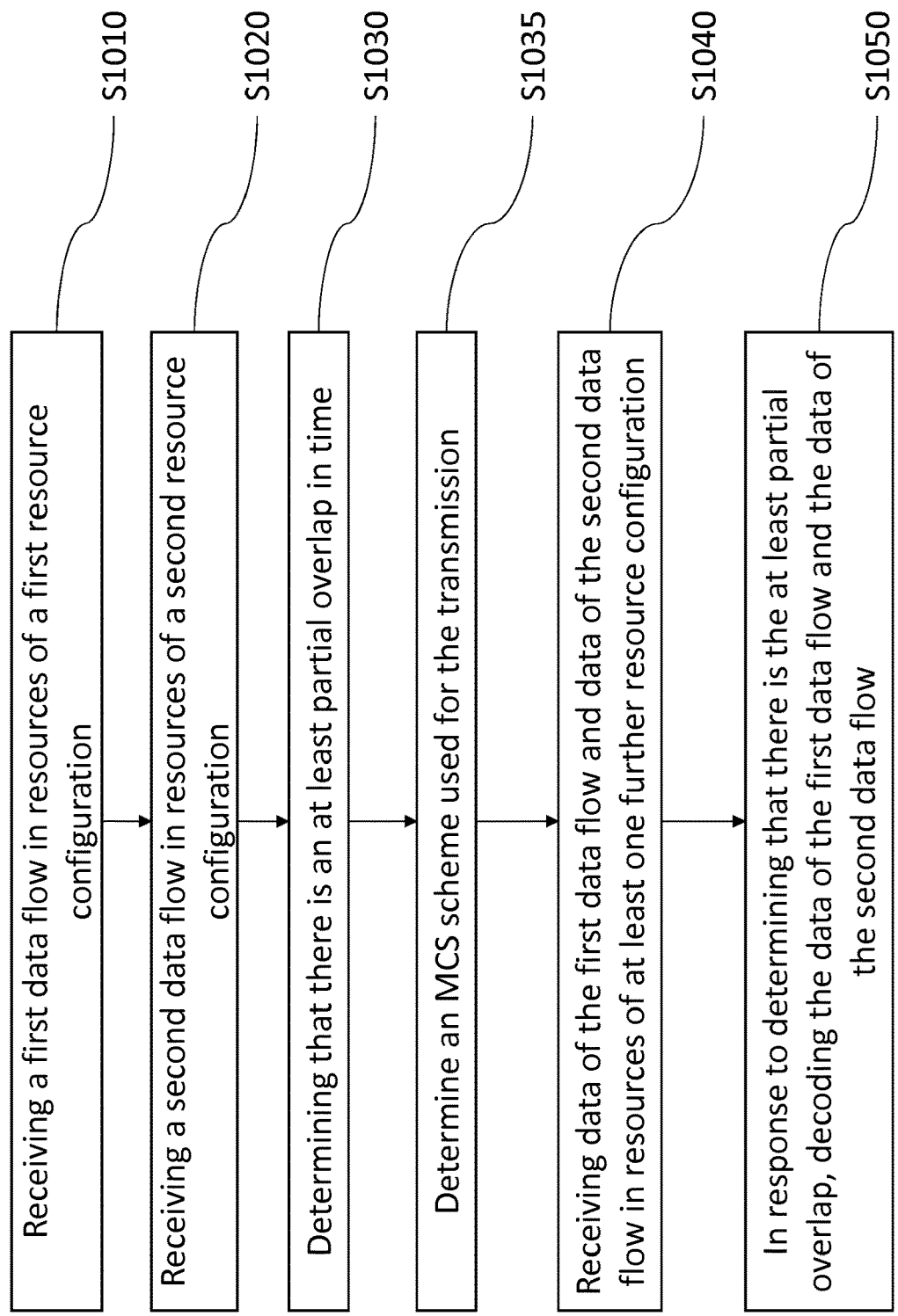
FIG. 10 illustrates an example of a method that may be performed in a receiving apparatus.

Reference is made to FIG. 10, which illustrates an example of a method 1000 that may be performed in a receiving apparatus according to example embodiments of the application. The receiving apparatus may be device 505 or network side apparatus, such as base station 510 or control apparatus 525.

At S1010, the receiving apparatus receives from the transmitting apparatus discussed above, the data of the first data flow in resources of the first resource configuration. This data is received in one or more allocations of the first resource configuration. The receiving apparatus decodes the transport blocks sent in the allocations of the first resource configuration.

At S1020, the receiving apparatus receives from the transmitting apparatus, data of the second data flow in resources of the second resource configuration. This data is received in one or more allocations of the second resource configuration. The receiving apparatus decodes the transport blocks sent in the allocations of the second resource configuration.

At S1030, the receiving apparatus determines there is an at least partial overlap in time between a first allocation of the first resource configuration and a second allocation of the second resource configuration. The receiving apparatus may make this determination autonomously by analysing the resource configurations to determine when a collision will occur. Alternatively, the receiving apparatus may make this determination in response to receipt of control information received from the transmitting apparatus. For example, a device 505 may receive an indication in control information sent in the downlink that data will transmitted in the downlink in collision dependent resources (which are used in the case of an overlap in time).

At S1035, the receiving apparatus determines the MCS scheme that will be used for the transmission of data by the transmitting apparatus. The receiving apparatus may determine this MCS in dependence upon at least one of the MCSs used for transmitting data in the original resource configurations.

At S1040, the receiving apparatus receives data of the first data flow and data of the second data flow in at least one collision dependent resource configuration. The receiving apparatus may perform this step in response to the determination made in S1030. Based on the determination made in S1030, the receiving apparatus is configured to search the resources of the collision dependent resource configuration for data that is sent from the transmitting apparatus. The receiving apparatus is able to anticipate that data will be transmitting in these collision dependent resources in response to the determination made at S1030.

The data that is received at S1040 may comprise the data from the first data flow and the data from the second data flow in a single allocation of the collision dependent resource configuration. This single allocation may contain a single transport block (as described above with respect to FIGS. 7 and 8) containing the data from the first data flow and the data from the second data flow.

At S1050, in response to the determination that there is the partial overlap made at S1030, the receiving apparatus decodes the data received in the resources of the collision dependent resource configuration at S1040. Since the receiving apparatus is able to anticipate based on the determination of the collision at S1030 that data will be sent on the collision dependent resources, the receiving apparatus receives and decodes the data sent on these resources. The receiving apparatus decodes the data in dependence upon the MCS determined at S1035.

In some example embodiments, the data received at S1040 at the receiving apparatus is received (in the single-PUSCH auto-combining mode) in a combination of resources of a first allocation of the first resource configuration and a second allocation of the second resource configuration. As discussed, this may occur in the case that there is substantially a complete overlap in the time domain between the first allocation and the second allocation. In response to determining that there is substantially the complete overlap, the receiving apparatus is configured to receive and decode the data in the combined resources. This comprises the receiving apparatus receiving and decoding the single transport block that is received in the combined resources.

In some example embodiments, at S1040, the data of the first data flow and the data of the second data flow is received in a delayed allocation of the collision dependent resource configuration (as described above with respect to FIG. 8). This delayed allocation begins at the start in time of the second allocation. This may occur in the case of a partial overlap between allocations of the first and second resource configurations. The device at S1030, may determine that there is only a partial overlap between these allocations, and, at S1050 may, in response to the determination of the partial overlap, decode the data in the delayed allocation.

In some example embodiments, at S1040, the data of the first data flow and the data of the second data flow are transmitted in separate collision dependent resource configurations (as described above with respect to FIG. 8). This may occur in the case of a partial overlap between allocations of the first and second resource configurations. The device at S1030, may determine that there is only a partial overlap between these allocations, and, at S1050 may, in response to the determination of the partial overlap, decode the data received in the resources of both of the collision dependent resource configurations.

Figure 11:
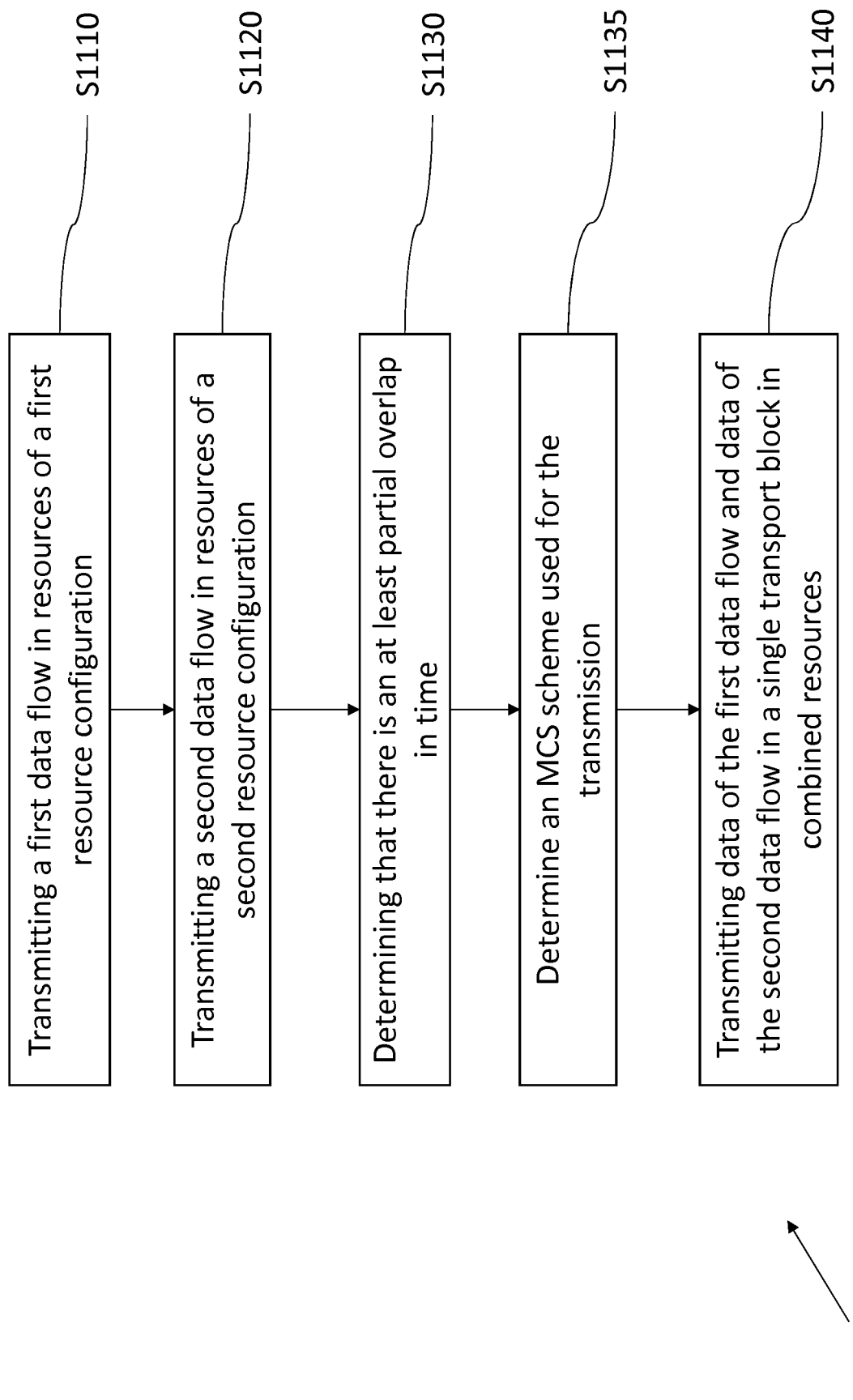
FIG. 11 illustrates an example of a method that may be performed in a transmitting apparatus.

Reference is made to FIG. 11, which illustrates an example of a method 1100 that may be performed in a transmitting apparatus according to example embodiments of the application. The method 1100 may be performed when the device is operating in the Single-PUSCH auto-combining mode. The transmitting apparatus may be device 505 or network side apparatus, such as base station 510 or control apparatus 525.

At S1110, the transmitting apparatus transmits a first data flow in resources of a first resource configuration.

At S1120, the transmitting apparatus transmits a second data flow in resources of a second resource configuration.

At S1130, the transmitting apparatus determines that there is an at least partial overlap in time between a first allocation of the first resource configuration and a second allocation of the second resource configuration.

At S1135, the apparatus comprises means for determining a modulation and coding scheme to use for transmitting the single transport block.

At S1140, in response to determining that there is the at least partial overlap, the transmitting apparatus transmits data of the first data flow and data of the second data flow in a single transport block in combined resources of the first allocation and second allocation.

It is noted that whilst some example embodiments have been described in the context of New Radio and Time Sensitive Networks, the invention is not so limited. Similar principles can be applied in relation to other standards, networks and communication systems. Therefore, although certain example embodiments were described above by way of example with reference to certain example architectures for wireless networks, technologies and standards, example embodiments may be applied to any other suitable forms of communication systems than those illustrated and described herein.

The system for implementing example embodiments of the application comprises required data processing apparatus and functions that may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory. One or more of the steps discussed in relation to FIGS. 9 to 11 may be performed by one or more processors in conjunction with one or more memories.

An appropriately adapted computer program code product or products may be used for implementing the example embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various example embodiments may be implemented in hardware or special purpose circuits, software, logic or any combination thereof. Example embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Figure 4:
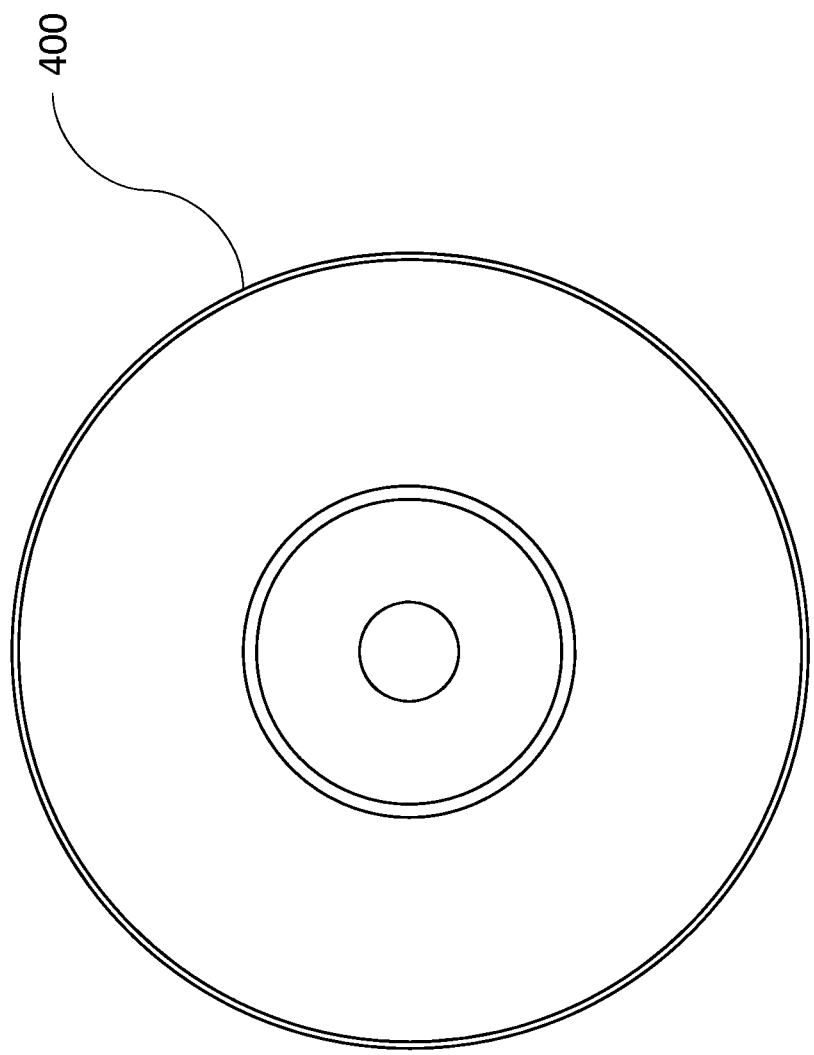
FIG. 4 illustrates an example of a non-transitory computer readable medium.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media. An example of a non-transitory computer readable medium 400 is shown in FIG. 4. The non-transitory computer readable medium 400 may be a CD or DVD.

It is noted that whilst example embodiments have been described in relation to certain architectures, similar principles can be applied to other systems. Therefore, although certain example embodiments were described above by way of example with reference to certain exemplifying architectures for wireless networks, technologies and standards, example embodiments may be applied to any other suitable forms of communication systems than those illustrated and described herein. It is also noted that different combinations of different example embodiments are possible. It is also noted herein that while the above describes exemplifying example embodiments of the invention, there are several variations and modifications which may be made to the disclosed solution without departing from the spirit and scope of the present invention.

Annex A

Assumptions regarding TSN flows as discussed in RAN2 and SA2:

TSN flows, being periodic flows with typically small payloads and a very short periodicity (or Cycle Time) down to <1 ms should be configured via semi-persistent (pre-allocated) allocations to avoid control channel impacts and dynamic scheduling complexities.

Both uplink (CG, configured grant) and downlink (SPS, semi-persistent scheduling) will see enhancements to support such flows effectively as part of the Release 16 of NR normative phase. As an example, the support of multiple active CG configurations per UE per Bandwidth Part (BWP) has been agreed in RAN1 #95. Further enhancements such as better support for short periods as well as for multiple active SPS configurations are also part of Rel-16 Work Item on NR Industrial IoT.

The SPS/CG configurations will be allocations earmarked to certain TSN flows—defined by new QoS Framework including periodicity (Cycle Time) and time-offset/phase of flow—by making use e.g. of Logical Channel Prioritization (LCP) restrictions. When a CG configuration receive LCP (Logical Channel Priority) restrictions, the UE enables it only for non-restricted TSN flow(s) to ensure consistent transmission with low-jitter over the 5G Access Network.

As an additional abstraction, different TSN flows will be defined based on potentially different time-domains (up to 32 being discussed), e.g. one TSN flow may be scheduled according to a "Working Clock A" while another TSN flow may be scheduled according to a "Working Clock B". One SPS or CG configuration may be associated to at least one data flow belonging to a distinct time-domain, i.e. only one TD per SPS/CG allocation. This means that multiple SPS and CG configurations will be allocated if a UE handles multiple data flows belonging to different time-domains (TDs) or if a UE acts as a hub and thus acts as proxy for many independent TSN flows for connected devices (e.g. robots, actuators, etc.).

The invention claimed is:

1. An apparatus comprising circuitry configured for:
transmitting a first data flow in resources of a first resource configuration; and transmitting a second data flow in resources of a second resource configuration;
determining that there is an at least partial overlap in time between a first allocation of the first resource configuration and a second allocation of the second resource configuration; and
in response to determining that there is the at least partial overlap, transmitting data of the first data flow and data of the second data flow in resources of at least one further resource configuration,
the apparatus further comprising circuitry configured for determining a modulation and coding scheme to use for transmitting data on the at least one further resource configuration in dependence upon at least one of:
a modulation and coding scheme used for transmitting the first data flow in the resources of the first resource configuration; and
a modulation and coding scheme used for transmitting the second data flow in the resources of the second resource configuration.

2. An apparatus as claimed in claim 1, comprising circuitry configured for:
transmitting the data of the first data flow in an allocation of a first of the at least one further resource configuration; and
transmitting the data of the second data flow in the allocation of the first at least one further resource configuration.

3. An apparatus as claimed in claim 2, wherein the frequency width of the allocation of the first at least one further resource configuration is greater than the frequency width of the first allocation and the frequency width second allocation.

4. An apparatus as claimed in claim 2, wherein the transmitting the data of the first data flow in the allocation of the first of the at least one further resource configuration comprises transmitting the data of the first data flow in a first transport block,
wherein the transmitting the data of the second data flow in the allocation of the first at least one further resource configuration comprises transmitting the data of the second data flow in the first transport block.

5. An apparatus as claimed claim 1, wherein the transmitting data of the first data flow and data of the second data flow in resources of at least one further resource configuration comprises transmitting data of the first data flow and data of the second data flow in a combination of resources of the first resource configuration and the second resource configuration.

6. An apparatus as claimed in claim 5, comprising circuitry configured for:
determining that there is substantially a complete overlap in time between the first allocation and the second allocation; and
in response to determining that there is substantially the complete overlap, performing the transmitting data of the first data flow and data of the second data flow in the combination of resources of the first resource configuration and the second resource configuration.

7. An apparatus as claimed in claim 2, comprising circuitry configured for:
determining that there is a partial overlap in time between the first allocation and the second allocation; and
in response to determining that there is the partial overlap, performing the transmission of the data of the first data flow and the data of the second data flow in the allocation beginning from a start in time of the second allocation,
wherein the first allocation begins prior to the second allocation.

8. An apparatus as claimed in claim 1, comprising circuitry configured for transmitting:
the data of the first data flow in resources of a first of at least one further period resource configuration; and
the data of the second data flow in resources of a second of the at least one further resource configuration,
wherein the second of the at least one further resource configuration comprises an allocation following an allocation of the first of the at least one further resource configuration.

9. An apparatus as claimed in claim 8, comprising circuitry configured for:
determining that there is a partial overlap in time between the first allocation and the second allocation; and
in response to determining that there is the partial overlap, performing the transmitting: the data of the first data flow in resources of the first of at least one further period resource configuration; and the data of the second data flow in resources of the second of the at least one further resource configuration.

10. An apparatus as claimed in claim 8, wherein the first of the at least one further resource configuration is configured with different parameters to the second of the at least one further resource configuration, wherein the parameters comprise at least one of:
modulation and coding scheme;
target code rate;
target transport block size
frequency domain resources allocation;
time domain resources allocation;
block error rate target per transmission;
reliability target per transmission; or
quality of service requirements.

11. An apparatus as claimed in claim 1, comprising circuitry configured for determining the at least one further resource configuration in dependence upon the first resource configuration and the second resource configuration.

12. An apparatus as claimed in claim 1, wherein:
the first resource configuration comprises a first periodic resource pattern;
the second resource configuration comprises a second periodic resource pattern; and
the at least one further resource configuration comprises at least one further periodic resource pattern.

13. An apparatus as claimed in claim 12, wherein the first periodic resource pattern comprises a first configured grant, wherein the second periodic resource pattern comprises a second configured grant, wherein the at least one further periodic resource pattern comprises at least one further configured grant.

14. An apparatus as claimed in claim 12, wherein the first periodic resource pattern, the second periodic resource pattern, and the at least one further periodic resource pattern each comprise resources on which data is semi-persistently scheduled for transmission.

15. An apparatus comprising circuitry configured for:
receiving a first data flow in resources of a first resource configuration;
receiving a second data flow in resources of a second resource configuration;

determining that there is an at least partial overlap in time between a first allocation of the first resource configuration and a second allocation of the second resource configuration;

receiving data of the first data flow and data of the second data flow in resources of at least one further resource configuration; and in response to determining that there is the at least partial overlap, decoding the data of the first data flow and the data of the second data flow received in the resources of at least one further resource configuration, the apparatus further comprising circuitry configured for:

determining a modulation and coding scheme for use on the at least one further resource configuration in dependence upon at least one of:

a modulation and coding scheme used for the first data flow in the resources of the first resource configuration; or a modulation and coding scheme used for the second data flow in the resources of the second resource configuration; and performing the decoding of the data of the first data flow and the data of the second data flow according to the determined modulation and coding scheme.

16. An apparatus as claimed in claim 15, comprising circuitry configured for:

receiving the data of the first data flow in an allocation of a first of the at least one further resource configuration;

receiving the data of the second data flow in the allocation of the first at least one further resource configuration.

17. An apparatus as claimed in claim 16, wherein the frequency width of the allocation of the first at least one further resource configuration is greater than the frequency width of the first allocation and the frequency width of the second allocation.

18. An apparatus as claimed in claim 16, wherein the receiving the data of the first data flow in the allocation of the first of the at least one further resource configuration comprises receiving the data of the first data flow in a first transport block, wherein the receiving the data of the second data flow in the allocation of the first at least one further resource configuration comprises receiving the data of the second data flow in the first transport block, the apparatus comprising circuitry configured for, in response to determining that there is the at least partial overlap, decoding the first transport block.

19. An apparatus as claimed in claim 15, wherein the receiving data of the first data flow and data of the second data flow in resources of at least one further resource configuration comprises receiving data of the first data flow and data of the second data flow in a combination of resources of the first resource configuration and the second resource configuration.

20. An apparatus as claimed in claim 19, comprising circuitry configured for:

determining that there is substantially a complete overlap in time between the first allocation and the second allocation; and in response to determining that there is substantially the complete overlap, decoding the data of the first data flow and data of the second data flow received in the combination of resources of the first allocation and the second allocation.

21. An apparatus as claimed claim 16, comprising circuitry configured for:

receiving the data of the first data flow and the data of the second data flow in the allocation beginning from a start in time of the second allocation;

determining that there is a partial overlap in time between the first allocation and the second allocation; and in response to determining that there is the partial overlap, decoding the data of the first data flow and the data of the second data flow received in the allocation beginning from the start in time of the second allocation, wherein the first allocation begins prior to the second allocation.

22. An apparatus as claimed in claim 15, comprising circuitry configured for receiving and decoding:

the data of the first data flow in resources of a first of at least one further period resource configuration; and the data of the second data flow in resources of a second of the at least one further resource configuration, wherein the second of the at least one further resource configuration comprises an allocation following an allocation of the first of the at least one further resource configuration.

23. An apparatus as claimed in claim 22, comprising circuitry configured for:

determining that there is a partial overlap in time between the first allocation and the second allocation; and in response to determining that there is the partial overlap, performing the decoding of: the data of the first data flow in resources of the first of at least one further period resource configuration; and the data of the second data flow in resources of the second of the at least one further resource configuration.

24. An apparatus as claimed in claim 22, wherein the first of the at least one further resource configuration is configured with different parameters to the second of the at least one further resource configuration, wherein the different parameters comprise at least one of:

modulation and coding scheme;
target code rate;
target transport block size;
frequency domain resources allocation;
time domain resources allocation;
block error rate target per transmission;
reliability target per transmission; or
quality of service requirements.

25. An apparatus as claimed in claim 15, comprising circuitry configured for determining the at least one further resource configuration in dependence upon the first resource configuration and the second resource configuration; and performing the decoding of the data of the first data flow and the data of the second data flow in dependence upon the determined at least one further resource configuration.

26. An apparatus as claimed in claim 15, wherein:

the first resource configuration comprises a first periodic resource pattern;

the second resource configuration comprises a second periodic resource pattern; and the at least one further resource configuration comprises at least one further periodic resource pattern.

27. An apparatus as claimed in claim 26, wherein the first periodic resource pattern comprises a first configured grant, wherein the second periodic resource pattern comprises a second configured grant, wherein the at least one further periodic resource pattern comprises at least one further configured grant.

28. An apparatus as claimed in claim 26, wherein the first periodic resource pattern, the second periodic resource pattern, and the at least one further periodic resource pattern comprises resources on which data is semi-persistently scheduled for transmission.

29. A method comprising:
   transmitting a first data flow in resources of a first resource configuration; and
   transmitting a second data flow in resources of a second resource configuration;
   determining that there is an at least partial overlap in time between a first allocation of the first resource configuration and a second allocation of the second resource configuration; and
   in response to determining that there is the at least partial overlap, transmitting data of the first data flow and data of the second data flow in resources of at least one further resource configuration,
   the method further comprising determining a modulation and coding scheme to use for transmitting data on the at least one further resource configuration in dependence upon at least one of:
   a modulation and coding scheme used for transmitting the first data flow in the resources of the first resource configuration; and
   a modulation and coding scheme used for transmitting the second data flow in the resources of the second resource configuration.

30. A method comprising:
   receiving a first data flow in resources of a first resource configuration;
   receiving a second data flow in resources of a second resource configuration;
   determining that there is an at least partial overlap in time between a first allocation of the first resource configuration and a second allocation of the second resource configuration;
   receiving data of the first data flow and data of the second data flow in resources of at least one further resource configuration; and
   in response to determining that there is the at least partial overlap, decoding the data of the first data flow and the data of the second data flow received in the resources of at least one further resource configuration,
   the method further comprising:
   determining a modulation and coding scheme for use on the at least one further resource configuration in dependence upon at least one of:
   a modulation and coding scheme used for the first data flow in the resources of the first resource configuration; or
   a modulation and coding scheme used for the second data flow in the resources of the second resource configuration; and
   performing the decoding of the data of the first data flow and the data of the second data flow according to the determined modulation and coding scheme.

* * * * *